(12) United States Patent
Diancin

(10) Patent No.: US 10,334,458 B2
(45) Date of Patent: Jun. 25, 2019

(54) INTELLIGENT SEQUENCING OF MULTIPLE WIRELESS NODES FOR TRANSFER BETWEEN WIRELESS MESH NETWORKS IN A PROCESS CONTROL SYSTEM

(71) Applicant: FISHER-ROSEMOUNT SYSTEMS, INC., Round Rock, TX (US)

(72) Inventor: Wynn Gervacio Diancin, Bataan (PH)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 93 days.

(21) Appl. No.: 15/585,381

(22) Filed: May 3, 2017

(65) Prior Publication Data

US 2018/0324609 A1 Nov. 8, 2018

(51) Int. Cl.
*H04W 24/04* (2009.01)
*H04W 84/18* (2009.01)
*H04W 92/20* (2009.01)

(52) U.S. Cl.
CPC ............ *H04W 24/04* (2013.01); *H04W 84/18* (2013.01); *H04W 92/20* (2013.01)

(58) Field of Classification Search
None
See application file for complete search history.

(56) References Cited

U.S. PATENT DOCUMENTS

2009/0059814 A1 3/2009 Nixon et al.
2009/0117949 A1 5/2009 Allen, Jr. et al.
2011/0164512 A1 7/2011 Citrano, III et al.
2012/0307624 A1* 12/2012 Vasseur ............... H04L 41/0659 370/221
2016/0345215 A1* 11/2016 Astrom ............... H04L 67/2809

FOREIGN PATENT DOCUMENTS

CA 2 733 268 A1 4/2010

OTHER PUBLICATIONS

Search Report for Application No. GB1807269.4, dated Sep. 25, 2018.

* cited by examiner

*Primary Examiner* — Rebecca E Song
(74) *Attorney, Agent, or Firm* — Marshall, Gerstein & Borun LLP

(57) ABSTRACT

A method of sequencing a logical transfer of wireless nodes between wireless mesh networks includes iteratively evaluating each wireless node in a first set of wireless nodes to be transferred. Each evaluation includes a predictive analysis of a source wireless mesh network which tests communications between the gateway of the source wireless mesh network and each of the remaining wireless nodes, and a predictive analysis of the wireless node under evaluation in a destination wireless mesh network which tests communications between the gateway of the destination wireless mesh network and the wireless node under evaluation. The wireless node under evaluation is appended to a second set of wireless nodes to be transferred in response to the first predictive analysis of the source mesh network, and the predictive analysis of the wireless node under evaluation. The wireless nodes are structured in the second set in order of priority of transfer.

39 Claims, 12 Drawing Sheets

FIG. 7A

| NODE | SOURCE | DESTINATION | HOPS |
|---|---|---|---|
| GW1WD6 | GW1 | GW3 | 2 |
| GW2WD7 | GW2 | GW3 | 2 |
| GW2WD8 | GW2 | GW3 | 2 |
| GW2WD9 | GW2 | GW3 | 3 |
| GW3WD4 | GW3 | GW2 | 1 |
| GW3WD6 | GW3 | GW1 | 2 |
| GW3WD10 | GW3 | GW1 | 3 |

FIG. 7B

| NODE | SOURCE | DESTINATION | HOPS |
|---|---|---|---|
| GW1WD6 | GW1 | GW3 | 2 |
| GW2WD9 | GW2 | GW3 | 3 |
| GW2WD8 | GW2 | GW3 | 2 |
| GW2WD7 | GW2 | GW3 | 2 |
| GW3WD10 | GW3 | GW1 | 3 |
| GW3WD6 | GW3 | GW1 | 2 |
| GW3WD4 | GW3 | GW2 | 1 |

FIG. 7C

| NODE | SOURCE | DESTINATION | HOPS |
|---|---|---|---|
| GW2WD9 | GW2 | GW3 | 3 |
| GW2WD8 | GW2 | GW3 | 2 |
| GW2WD7 | GW2 | GW3 | 2 |
| GW3WD10 | GW3 | GW1 | 3 |
| GW3WD6 | GW3 | GW1 | 2 |
| GW3WD4 | GW3 | GW2 | 1 |
| GW1WD6 | GW1 | GW3 | 2 |

FIG. 7D

| GW1 | GW2 | GW3 |
|---|---|---|
| GW1WD1 | GW2WD1 | GW3WD1 |
| GW1WD2 | GW2WD2 | GW3WD2 |
| GW1WD3 | GW2WD3 | GW3WD3 |
| GW1WD4 | GW2WD4 | GW3WD5 |
| GW1WD5 | GW2WD5 | GW3WD7 |
| GW1W7 | GW2WD6 | GW3WD8 |
| GW1W8 |  | GW3WD9 |
| GW1W9 |  |  |

FIG. 7E

| NODE |
|---|
| GW2WD9 |
| GW2WD8 |
| GW2WD7 |
| GW3WD10 |
| GW3WD6 |
| GW3WD4 |
| GW1WD6 |

| NODE | HOP COUNT |
|---|---|
| GW4WD4 | 6 |
| GW4WD3 | 5 |
| GW4WD2 | 4 |
| GW4WD1 | 3 |
| GW5WD4 | 5 |
| GW5WD3 | 4 |
| GW5WD2 | 3 |
| GW5WD1 | 2 |

FIG. 11A

| NODE | HOP COUNT |
|---|---|
| GW4WD4 | 6 |
| GW4WD3 | 5 |
| GW5WD4 | 5 |
| GW4WD2 | 4 |
| GW5WD3 | 4 |
| GW4WD1 | 3 |
| GW5WD2 | 3 |
| GW5WD1 | 2 |

FIG. 11B

INTELLIGENT SEQUENCING OF MULTIPLE WIRELESS NODES FOR TRANSFER BETWEEN WIRELESS MESH NETWORKS IN A PROCESS CONTROL SYSTEM

TECHNICAL FIELD

The present disclosure relates generally to process control systems, and, more particularly, to sequencing logical transfers of wireless nodes between live wireless mesh networks in process control systems.

BACKGROUND

Process control systems are widely used in factories and/or plants in which products are manufactured or processes are controlled (e.g., chemical manufacturing, power plant control, etc.). Process control systems are also used in the harvesting of natural resources such as, for example, oil and gas drilling and handling processes, etc. In fact, virtually any manufacturing process, resource harvesting process, etc. can be automated through the application of one or more process control systems. It is believed the process control systems will eventually be used more extensively in agriculture as well.

Distributed process control systems, like those used in chemical, petroleum or other processes, typically include one or more centralized or decentralized process controllers communicatively coupled to at least one host or operator workstation and to one or more process control and instrumentation devices, such as field devices, via analog, digital or combined analog/digital buses or via a wireless communication link or network. A process controller (sometimes referred to as a "controller"), which is typically located within the plant or other industrial environment, receives signals (sometimes referred to as "control inputs") indicative of process measurements and uses the information carried by these signals to implement control routines that cause the controller to generate control signals (sometimes referred to as "control outputs") based on the control inputs and the internal logic of the control routines. The controllers send the generated control signals over buses or other communication links to control operation of field devices. In some instances, the controllers may coordinate with control routines implemented by smart field devices, such as Highway Addressable Remote Transmitter (HART®), WirelessHART®, and FOUNDATION® Fieldbus (sometimes just called "Fieldbus") field devices. Moreover, in many cases, there may be plant or other industrial equipment that operates in the plant or other industrial setting to perform some function that is not under direct control of the process controller, such as vibration detection equipment, rotating equipment, electrical power generating equipment, etc.

Field devices that are typically associated with the controller, which may be, for example valves, valve positioners, switches, transmitters, and sensors (e.g., temperature, pressure and flow rate sensors), are located within the process environment and generally perform physical or process control functions. For example, a valve may open or close in response to a control output received from a controller, or may transmit to a controller a measurement of a process parameter so that the controller can utilize the measurement as a control input. Smart field devices, such as field devices conforming to the well-known Fieldbus protocol may also perform control calculations, alarming functions, and other control functions commonly implemented within a controller. Field devices may be configured to communicate with controllers and/or other field devices according to various communication protocols. For example, a plant may include traditional analog 4-20 mA field devices, HART® field devices, Fieldbus field devices, and/or other types of field devices.

The process controllers receive signals indicative of process measurements or process variables made by or associated with the field devices and/or other information pertaining to the field devices, and execute a controller application that runs, for example, different control modules that make process control decisions, generate control signals based on the received information, and coordinate with the control modules or blocks being performed in the field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers, or computing devices, data historians, report generators, centralized databases, or other centralized administrative computing devices that are typically, but not always, placed in control rooms or other locations away from the harsher plant environment. Each of these hardware devices typically, though not always, is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers, and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more operator workstations or computing devices, enables users to create or change process control modules and download these process control modules via a data highway to dedicated distributed controllers. Typically, these control modules are made up of communicatively interconnected function blocks, which perform functions within the control scheme based on inputs thereto and which provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the operator interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

As noted above, operator display applications are typically implemented on a system wide basis in one or more of the workstations and provide displays to the operator or maintenance persons regarding the operating state of the control system or the devices within the plant. Typically, these displays take the form of alarming displays that receive alarms generated by controllers or devices within the process plant, control displays indicating the operating state of the controllers and other devices within the process plant, maintenance displays indicating the operating state of the devices within the process plant, etc. These displays are generally configured to display, in known manners, information or data received from the process control modules or the devices within the process plant. In some known systems, displays have a graphic associated with a physical or logical element that is communicatively tied to the physical or logical element to receive data about the physical or logical element. The graphic may be changed on the display screen based on the received data to illustrate, for example, that a tank is half full, to illustrate the flow measured by a flow sensor, etc.

Traditional analog 4-20 mA field devices communicate with a controller via a two-wire communication link (sometimes called a "loop" or "current loop") configured to carry a 4-20 mA DC signal indicative of a measurement or control command. For example, a level transmitter may sense a tank level and transmit via the loop a current signal corresponding to that measurement (e.g., a 4 mA signal for 0% full, a 12 mA signal for 50% full, and a 20 mA signal for 100% full). The controller receives the current signal, determines the tank level measurement based on the current signal, and takes some action based on the tank level measurement (e.g., opening or closing an inlet valve). Analog 4-20 mA field devices typically come in two varieties including four-wire field devices and two-wire field devices. A four-wire field device typically relies on a first set of wires (i.e., the loop) for communication, and a second set of wires for power. A two-wire field device relies on the loop for both communication and power. These two-wire field devices may be called "loop powered" field devices.

Process plants often implement traditional 4-20 mA systems due to the simplicity and effectiveness of the design. Unfortunately, traditional 4-20 mA current loops only transmit one process signal at a time. Thus, a set-up including a control valve and a flow transmitter on a pipe carrying material may require three separate current loops: one for carrying a 4-20 mA signal indicative of a control command for the valve (e.g., to move the valve to 60% open); a second for carrying a 4-20 mA signal indicative of the valve's actual position (e.g., so that the controller knows the degree to which the valve has responded to control commands); and a third for carrying a 4-20 mA signal indicative of a measured flow. As a result, a traditional 4-20 mA set-up in a plant having a large number of field devices may require extensive wiring, which can be costly and can lead to complexity when setting up and maintaining the communication system.

More recently, the process control industry has moved to implement digital communications within the process control environment. For example, the HART® protocol uses the loop DC magnitude to send and receive analog signals, but also superimposes an AC digital carrier signal on the DC signal to enable two-way field communications with smart field instruments. As another example, the Fieldbus protocol provides all-digital communications on a two-wire bus (sometimes called a "segment" or "Fieldbus segment"). This two-wire Fieldbus segment can be coupled to multiple field devices to provide power to the multiple field devices (via a DC voltage available on the segment) and to enable communication by the field devices (via an AC digital communication signal superimposed on the DC power supply voltage). Generally speaking, because the connected field devices use the same segment for communication and are connected in parallel, only one field device can transmit a message at any given time over the segment. Accordingly, communication on a segment is coordinated by a device designated as a link active scheduler (LAS). The LAS is responsible for passing a token between field devices connected to the segment. Only the device with the token may communicate over the segment at a particular time.

These digital communication protocols generally enable more field devices to be connected to a particular communication link, support more and faster communications between the field devices and the controller, and/or allow field devices to send more and different types of information (such as information pertaining to the status and configuration of the field device itself) to the process controller and other devices in or connected to the control network. Furthermore, these standard digital protocols enable field devices made by different manufacturers to be used together within the same process control network.

The various devices within the process plant may be interconnected in physical and/or logical groups to create a logical process, such as a control loop. Likewise, a control loop may be interconnected with other control loops and/or devices to create sub-units. A sub-unit may be interconnected with other sub-units to create a unit, which in turn, may be interconnected with other units to create an area. Process plants generally include interconnected areas, and business entities generally include process plants which may be interconnected. As a result, a process plant includes numerous levels of hierarchy having interconnected assets, and a business enterprise may include interconnected process plants. In other words, assets related to a process plant, or process plants themselves, may be grouped together to form assets at higher levels.

Thus, one particularly important aspect of process control system design involves the manner in which field devices are communicatively coupled to each other, to controllers and to other systems or devices within a process control system or a process plant. In general, the various communication channels, links and paths that enable the field devices to function within the process control system are commonly collectively referred to as an input/output (I/O) communication network.

The communication network topology and physical connections or paths used to implement an I/O communication network can have a substantial impact on the robustness or integrity of field device communications, particularly when the I/O communications network is subjected to environmental factors or conditions associated with the process control system. For example, many industrial control applications subject field devices and their associated I/O communication networks to harsh physical environments (e.g., high, low or highly variable ambient temperatures, vibrations, corrosive gases or liquids, etc.), difficult electrical environments (e.g., high noise environments, poor power quality, transient voltages, etc.), etc. In any case, environmental factors can compromise the integrity of communications between one or more field devices, controllers, etc. In some cases, such compromised communications could prevent the process control system from carrying out its control routines in an effective or proper manner, which could result in reduced process control system efficiency and/or profitability, excessive wear or damage to equipment, dangerous conditions that could damage or destroy equipment, building structures, the environment and/or people, etc.

In order to minimize the effect of environmental factors and to assure a consistent communication path, I/O communication networks used in process control systems have historically been hardwired networks, with the wires being encased in environmentally protected materials such as insulation, shielding and conduit. Also, the field devices within these process control systems have typically been communicatively coupled to controllers, workstations, and other process control system components using a hardwired hierarchical topology in which non-smart field devices are directly coupled to controllers using analog interfaces such as, for example, 4-20 mA, 0-10 VDC, etc. hardwired interfaces or I/O boards. Smart field devices, such as Fieldbus devices, are also coupled via hardwired digital data busses, which are coupled to controllers via smart field device interfaces.

While hardwired I/O communication networks can initially provide a robust I/O communication network, their robustness can be seriously degraded over time as a result of environmental stresses (e.g., corrosive gases or liquids, vibration, humidity, etc.). For example, contact resistances associated with the I/O communication network wiring may increase substantially due to corrosion, oxidation and the like. In addition, wiring insulation and/or shielding may degrade or fail, thereby creating a condition under which environmental electrical interference or noise can more easily corrupt the signals transmitted via the I/O communication network wires. In some cases, failed insulation may result in a short circuit condition that results in a complete failure of the associated I/O communication wires.

Additionally, hardwired I/O communication networks are typically expensive to install, particularly in cases where the I/O communication network is associated with a large industrial plant or facility that is distributed over a relatively large geographic area, for example, an oil refinery or chemical plant that consumes several acres of land. In many instances, the wiring associated with the I/O communication network must span long distances and/or go through, under or around many structures (e.g., walls, buildings, equipment, etc.) Such long wiring runs typically involve substantial amounts of labor, material and expense. Further, such long wiring runs are especially susceptible to signal degradation due to wiring impedances and coupled electrical interference, both of which can result in unreliable communications.

Moreover, such hardwired I/O communication networks are generally difficult to reconfigure when modifications or updates are needed. Adding a new field device typically requires the installation of wires between the new field device and a controller. Retrofitting a process plant in this manner may be very difficult and expensive due to the long wiring runs and space constraints that are often found in older process control plants and/or systems. High wire counts within conduits, equipment and/or structures interposing along available wiring paths, etc., may significantly increase the difficulty associated with retrofitting or adding field devices to an existing system. Exchanging an existing field device with a new device having different field wiring requirements may present the same difficulties in the case where more and/or different wires have to be installed to accommodate the new device. Such modifications may often result in significant plant downtime.

Wireless I/O communication networks have been used to alleviate some of the difficulties associated with hardwired I/O networks, and to alleviate the costs involved in deploying sensors and actuators within the process control system. Wireless I/O communication networks have also been suggested for process control systems and portions thereof that are relatively inaccessible or inhospitable for hardwired I/O communication networks. For example, Shepard et al., U.S. Pat. No. 7,436,797 entitled "Wireless Architecture And Support For Process Control Systems" and patented Oct. 14, 2008, the content of which is expressly incorporated by reference herein, discloses that relatively inexpensive wireless mesh networks may be deployed within a process control system, either alone or in combination with point-to-point communications, to produce a robust wireless communication network that can be easily set up, configured, changed and monitored, to thereby make the wireless communication network more robust, less expensive and more reliable.

Wireless mesh networks (or mesh networking topology) utilize multiple nodes, each of which may serve not only as a client to receive and send its own data, but also as a repeater or relay to propagate data through the network to other nodes. Each node is connected to another neighboring node, and preferably to multiple neighboring nodes, each of which may be connected to additional neighboring nodes. The result is a network of nodes that provides multiple paths of communication from one node to another through the network, thereby creating a relatively inexpensive, robust network that allows for continuous connections and reconfigurations even when communication paths are broken or blocked.

In a wireless mesh network, each device (node) may connect to a gateway via direct wireless connection or indirectly via a connection through a neighboring device. Each device has a signal strength that generally correlates to the physical proximity of the device to the wireless gateway or to a neighboring device. In cases where no direct connection to the wireless gateway is available, each device connects to the gateway through another peer device that has a connection to the gateway or to another device. The number of relay nodes used to chain together a connection of another node to the gateway is known as the number of hops, and the order in which the device-to-gateway connections are established is known as the communication path.

One such wireless mesh network used in process control is the WirelessHART® mesh network developed by the HART Communication Foundation (such as the WirelessHART® mesh network described by the international standard IEC 62591). Generally speaking, a WirelessHART® mesh network is a multi-hop communication network having a gateway and multiple WirelessHART® devices (wireless nodes). The network is organized in a mesh topology and each device is capable of routing messages for other devices in order to relay data to and from the gateway. WirelessHART® devices are capable of self-diagnostics and generate their own alerts and wireless communication statistics.

In some cases, wireless nodes within the wireless mesh networks made need to be logically transferred from one wireless mesh network to another due to poor network configuration, introduction of interference, addition and removal of wireless nodes, pinch points, balancing, etc. That is, the wireless node may not need to be physically transferred or moved, but rather communicate with a gateway of a different wireless mesh network. For example, a process plant may include multiple wireless mesh networks, each with its own gateway and wireless nodes in communication, either directly or indirectly, with the gateway. As wireless nodes are added to a process control system (e.g., with the introduction of field devices, retrofitting field devices with wireless adapters, etc.), the wireless nodes may be added with little consideration as to which is the best gateway for communication (assuming the wireless node has the ability to communicate with more than one gateway). Alternatively, a device may be added to a wireless mesh network such that it is dependent upon only one other device (i.e., a pinch point) for communication with the gateway. A pinch point is a wireless node whose failure would result in at least one other wireless node no longer having a communication path to the gateway of the wireless mesh network.

Further, the introduction of additional wireless mesh networks in a process plant and/or poor configuration of wireless mesh networks may lead to an overall configuration of mesh networks that is less than optimal for communications among wireless nodes within a wireless mesh network. For instance, a wireless node may be able to communicate with a different gateway in fewer hops than the current gateway. In still other cases, electromagnetic and/or structural interference may be introduced into the process control system, thereby limiting a wireless node's communication paths with a gateway.

In each of these cases, a wireless node may be logically transferred from one wireless mesh network to another to avoid pinch points, communicate with a gateway in fewer hops, establish more communication paths with a gateway, avoid interference, etc., as part of maintaining the wireless mesh networks. That is, a wireless node may be disconnected from all communication paths with a gateway and connected to a new gateway of the new wireless mesh network via new communication paths. For example, a wireless node may have neighboring wireless nodes that it communications with in order to indirectly communicate with a gateway. The wireless node may be logically transferred by re-configuring the wireless node to cease communications with all neighboring wireless nodes, and establish communications with neighboring wireless nodes in the new wireless mesh network. A network manager of the new wireless mesh network may then collect information from the wireless node, assign new neighbors, establish communication paths between the gateway and the wireless node, schedule communications, etc.

Generally, such transfers were performed manually. A maintenance person would physically go out to the wireless node and reconfigure the wireless node using a handheld device or a modem connected to the host system. More recently, WirelessHART® gateway models featured an automated logical transfer or reassignment of a wireless node from one wireless mesh network to another using a HART command from the host system. In many cases, such transfers are performed while the wireless mesh networks are in operation (i.e., live), usually because the process control system is in operation. Taking a wireless mesh network offline to transfer a wireless node thus affects the downtime of the process control system.

Although this is a convenient tool for logically moving a wireless node around to improve network performance, if there are multiple wireless nodes among multiple wireless mesh networks that needed to be transferred among the wireless mesh networks, there is a risk that the transfer of one wireless node would cause other wireless nodes to be cut off from communicating with the gateway, because those wireless nodes depend upon the transferred wireless node as part of the communication paths with the gateway. Furthermore, there is a risk that the transferred node will be dependent upon other wireless nodes that have not yet been transferred to the new wireless mesh network in order to established a communication path to the gateway. Thus, if the wireless node is transferred prematurely, it will be unable to communicate with the gateway of the new wireless mesh network. As such, moving multiple wireless nodes among multiple wireless mesh networks involves the challenge of properly sequencing the wireless nodes for transfer so as to minimize downtime or disruption to any of the wireless nodes or the wireless mesh networks.

SUMMARY

When multiple nodes are to be logically transferred (i.e., the node does not need to be physically moved or configured) between multiple live mesh networks, the nodes are sequenced for transfer beforehand to minimize system downtime and minimize disturbance to other nodes. The sequencing of the nodes for transfer includes an evaluation of each node to be transferred. Each evaluation includes a predictive analysis of the current network without the node and of the node in the new network without nodes to be transferred out. In one example, a simulator or emulator may be used to model the mesh networks for the predictive analyses.

In analyzing the current network without the node, the evaluation tests communications between the gateway and each of the nodes remaining in the network. If one or more nodes are not communicating with the gateway, then the nodes have been isolated from the gateway, and the transfer will cause those nodes to lose communication within the mesh network. For example, the wireless node may be a pinch point for those nodes at the time of transfer, meaning another wireless node may need to be transferred into the current network first.

In analyzing the wireless node in the new network, the evaluation removes the nodes that are to be transferred out of the new network, and tests communications between the gateway and the wireless node in the new network. If the wireless node is unable to communicate with the gateway, then the wireless node likely needs another node to be transferred into the new network first.

If the wireless node being evaluated results in no nodes being isolated in the current network and is able to communicate with the gateway of the new network, the wireless node is added to the transfer sequence. On the other hand, if the wireless node being evaluated leaves a node isolated in the current network, or is unable to communicate with the gateway of the new network, the next wireless node to be transferred is evaluated for inclusion into the transfer sequence. Once the evaluation has been completed for all the wireless nodes to be transferred, any wireless node that was not included in the transfer sequence is evaluated again to see if a prior transfer changes the results of the analysis.

When all wireless nodes that are to be transferred are included in the transfer sequence, the nodes may be logically transferred according to the transfer sequence. For example, the gateways may issue transfer commands to the wireless nodes in the order of the transfer sequence.

BRIEF DESCRIPTION OF THE DRAWINGS

FIGS. 7A-7E are representations of the set and subset structures of wireless nodes to be transferred between wireless mesh networks during the gathering and structuring routine of FIG. 6;

FIGS. 11A and 11B are representations of the set structure of wireless nodes to be transferred between wireless mesh networks during the skip condition routine of FIG. 10.

DETAILED DESCRIPTION

Figure 1:
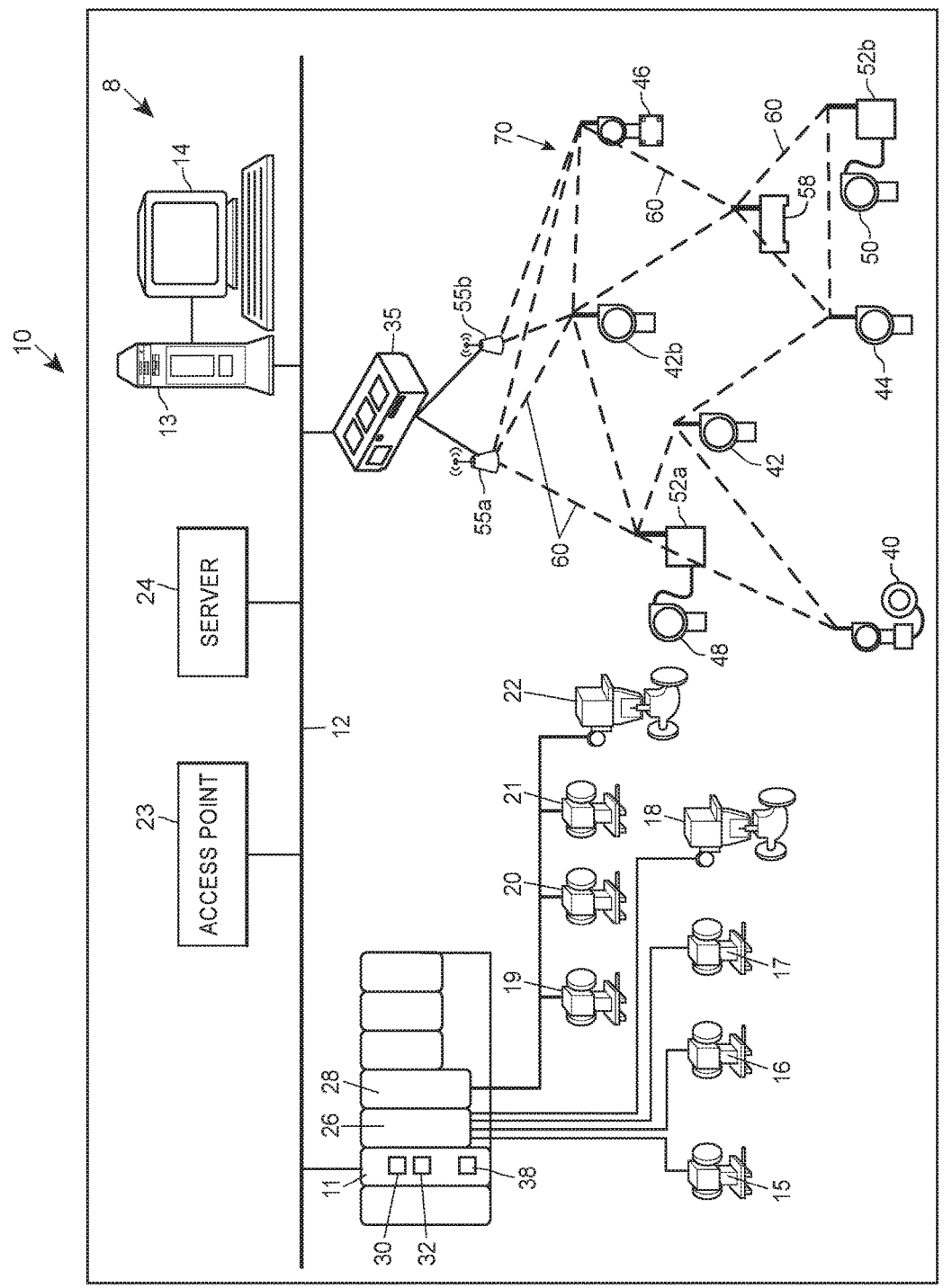
FIG. 1 is a combined block and schematic diagram of a distributed control system in accordance with this disclosure.

FIG. 1 is a block and schematic diagram of an exemplary process control network 8 operating in a process control system, process plant or other industrial setting 10. The process control network 8 may include a network backbone 12 providing connectivity directly or indirectly between a variety of other devices. The network backbone 12 may include both wireless and/or wired communication channels. The devices coupled to the network backbone 12 include, in various embodiments, combinations of access points 23, which may be handheld or other portable computing devices, such as a laptop computer, a tablet, a hand-held smart device, a portable testing device (PTD), etc., and host computers 13, such as a personal computer, workstation, etc. each having a display screen 14 as well as various other input/output devices (not shown), servers 24, etc.

As illustrated in FIG. 1, a controller 11 is connected to the field devices 15-22 via input/output (I/O) cards 26 and 28 which may implement any desired process control communication protocol, such as one or more of the HART, Fieldbus, CAN, Profibus, etc., protocols. The controller 11 is, in FIG. 1, communicatively connected to the field devices 15-22 to perform control of the field devices 15-22 and therefore control of the plant. Generally, the field devices 15-22 may be any types of devices, such as sensors, valves, transmitters, positioners, etc., while the I/O cards 26 and 28 may be any types of I/O devices conforming to any desired communication or controller protocol. For example, the field devices 15-22 and/or I/O cards 26 and 28 may be configured according to the HART protocol or to the Fieldbus protocol. The controller 11 includes a processor 30 that implements or oversees one or more process control routines 38 (or any module, block, or sub-routine thereof) stored in a memory 32. Generally speaking, the controller 11 communicates with the devices 15-22 and the host computers to control a process in any desired manner. Moreover, the controller 11 implements a control strategy or scheme using what are commonly referred to as function blocks (not shown), wherein each function block is an object or other part (e.g., a subroutine) of an overall control routine that operates in conjunction with other function blocks to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process control system 10. Of course, hybrid and other types of function blocks exist and may be utilized. The function blocks may be stored in and executed by the controller 11 or other devices.

As illustrated in FIG. 1, wireless communication networks 70 are likewise communicatively coupled to the network backbone 12. The wireless communication network 70 may include wireless gateways 35, wireless devices (also referred to as wireless nodes) 40-58, which include wireless field devices 40-46, wireless adapters 52a and 52b, access points 55a and 55b, and a router 58. The wireless adapters 52a and 52b may be connected to non-wireless field devices 48 and 50, respectively. Though FIG. 1 depicts only a single one of some of the devices connected to the network backbone 12, it will be understood that each of the devices could have multiple instances on the network backbone 12 and, in fact, that the process plant 10 may include multiple network backbones 12. Similarly, the process control network 8 may include multiple gateways and wireless communication networks 70.

The controller 11 may be communicatively connected to wireless field devices 40-46 via the network backbone 12 and the wireless gateway 35. The controller 11 may operate to implement a batch process or a continuous process using at least some of the field devices 15-22 and 40-50. The controller 11, which may be, by way of example, the DeltaV™ controller sold by Emerson Process Management, is communicatively connected to the process control network backbone 12. The controller 11 may be also communicatively connected to the field devices 15-22 and 40-50 using any desired hardware and software associated with, for example, standard 4-20 mA devices, I/O cards 26, 28, and/or any smart communication protocol such as the FOUNDATION® Fieldbus protocol, the HART® protocol, the Wireless HART® protocol, etc. In the embodiment illustrated in FIG. 1, the controller 11, the field devices 15-22 and the I/O cards 26, 28 are wired devices, and the field devices 40-46 are wireless field devices.

The processor 30 of the controller 11 implements or oversees one or more process control routines (stored in the memory 32), which may include control loops. The processor 30 may communicate with the field devices 15-22 and 40-50 and with other nodes that are communicatively connected to the backbone 12. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system may take any form, including software, firmware, hardware, etc. Control routines may be implemented in any desired software format, such as using object oriented programming, ladder logic, sequential function charts, function block diagrams, or using any other software programming language or design paradigm. In particular, the control routines may be implemented by a user through the host computer 14 or access points 23. The control routines may be stored in any desired type of memory, such as random access memory (RAM), or read only memory (ROM). Likewise, the control routines may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

Referring still to FIG. 1, the wireless field devices 40-46 communicate in a wireless communications network 70 using a wireless protocol, such as the WirelessHART® protocol. Such wireless field devices 40-46 may directly communicate with one or more other nodes of the process control network 8 that are also configured to communicate wirelessly (using the wireless protocol, for example). To communicate with one or more other nodes that are not configured to communicate wirelessly, the wireless field devices 40-46 may utilize a wireless gateway 35 connected to the backbone 12. Of course, the field devices 15-22 and 40-46 could conform to any other desired standard(s) or protocols, such as any wired or wireless protocols, including any standards or protocols developed in the future.

The wireless gateway 35 is an example of a provider device that may provide access to various wireless devices 40-58 of the wireless communications network 70. In particular, the wireless gateway 35, which may be, by way of example, the WirelessHART gateway sold by Emerson Process Management, provides communicative coupling between the wireless devices 40-58 and other nodes of the process control network 8 (including the controller 11). The wireless gateway 35 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks. In other cases, the wireless gateway 35 may translate commands between wired and wireless protocols that do not share any protocol layers.

Similar to the wired field devices 15-22, the wireless field devices 40-46 of the wireless communications network 70 may perform physical control functions within the process plant 10 (e.g., opening or closing valves or taking measurements of process parameters). The wireless field devices 40-46, however, are configured to communicate using the wireless communication protocol of the wireless communications network 70, whereas the wired field devices 15-22 are configured to communicate using a wired communication protocol (e.g., HART®, FOUNDATION® Fieldbus, etc.). As such, the wireless field devices 40-46, the wireless gateway, and other wireless nodes 52-58 of the wireless communications network 70 are producers and consumers of wireless communication packets, whereas the wired field devices 15-22 are producers and consumers of wired communication packets.

In some scenarios, the wireless communications network 70 may include non-wireless devices. For example, a field device 48 of FIG. 1A may be a legacy 4-20 mA device and a field device 50 may be a traditional wired HART device. To communicate within the network 70, the field devices 48 and 50 may be connected to the wireless communications network 70 via a wireless adaptor 52a or 52b. Additionally, the wireless adaptors 52a, 52b may support other communication protocols such as FOUNDATION® Fieldbus, PROFIBUS, DeviceNet, etc. Furthermore, the wireless communications network 70 may include one or more network access points 55a, 55b, which may be separate physical devices in wired communication with the wireless gateway 35 or may be provided with the wireless gateway 35 as an integral device. The wireless communications network 70 may also include one or more routers 58 to forward packets from one wireless device to another wireless device within the wireless communications network 70. The wireless devices 32-46 and 52-58 may communicate with each other and with the wireless gateway 35 over wireless links 60 of the wireless communications network 70.

In certain embodiments, the process control network 8 may include other nodes connected to the network backbone 12 that communicate using other wireless protocols. For example, the process control network 8 may include one or more wireless access points 23 that utilize other wireless protocols, such as WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 23 allow handheld or other portable computing devices to communicate over a respective wireless network that is different from the wireless communications network 70 and that supports a different wireless protocol than the wireless communications network 70. For example, a portable computing device may be a mobile workstation or diagnostic test equipment that is utilized by a user within the process plant. In some embodiments, the portable computing device communicates over the process control network 8 using a wireless access point 23. In some scenarios, in addition to portable computing devices, one or more process control devices (e.g., controller 11, wired field devices 15-22, or wireless devices 35, 40-58) may also communicate using the wireless network supported by the access points 23.

Although FIG. 1 illustrates a single controller 11 with a finite number of field devices 15-22, 40-50, this is only an illustrative and a non-limiting embodiment. Any number of controllers 11 may be included in the provider devices of the process control network 8, and any of the controllers 11 may communicate with any number of wired or wireless field devices 15-22, 40-50 to control a process in the plant 10. Furthermore, the process plant 10 may also include any number of wireless gateways 35, routers 58, access points 55, 23, host computers 13, and/or wireless communications networks 70.

For example, wireless networks may be deployed throughout the process control system as disclosed in U.S. Pat. No. 7,436,797 incorporated by reference above. As a result, some or all of the I/O devices within a process control system, such as sensors and actuators, may be deployed and communicatively coupled to the process control system using hardwired technologies, wireless technologies or combination thereof. For example, hardwired communications may be maintained between and among some of the controller 11, the host computers 13, and the field devices 15-22, whereas wireless communications may be established between and among others of the controller 11, the host computers 13, and field devices 40-50. Again, wireless technologies may include, but are not limited to, WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols, as well as satellite, Wi-Max, and other long-range wireless transmission. In particular, wireless technologies may include any commercial off-the-shelf wireless products to transmit process control data. A network protocol may be implemented on top of the wireless technology, or a new process control standard may be developed for wireless communication, such as WirelessHART®.

Figure 2:
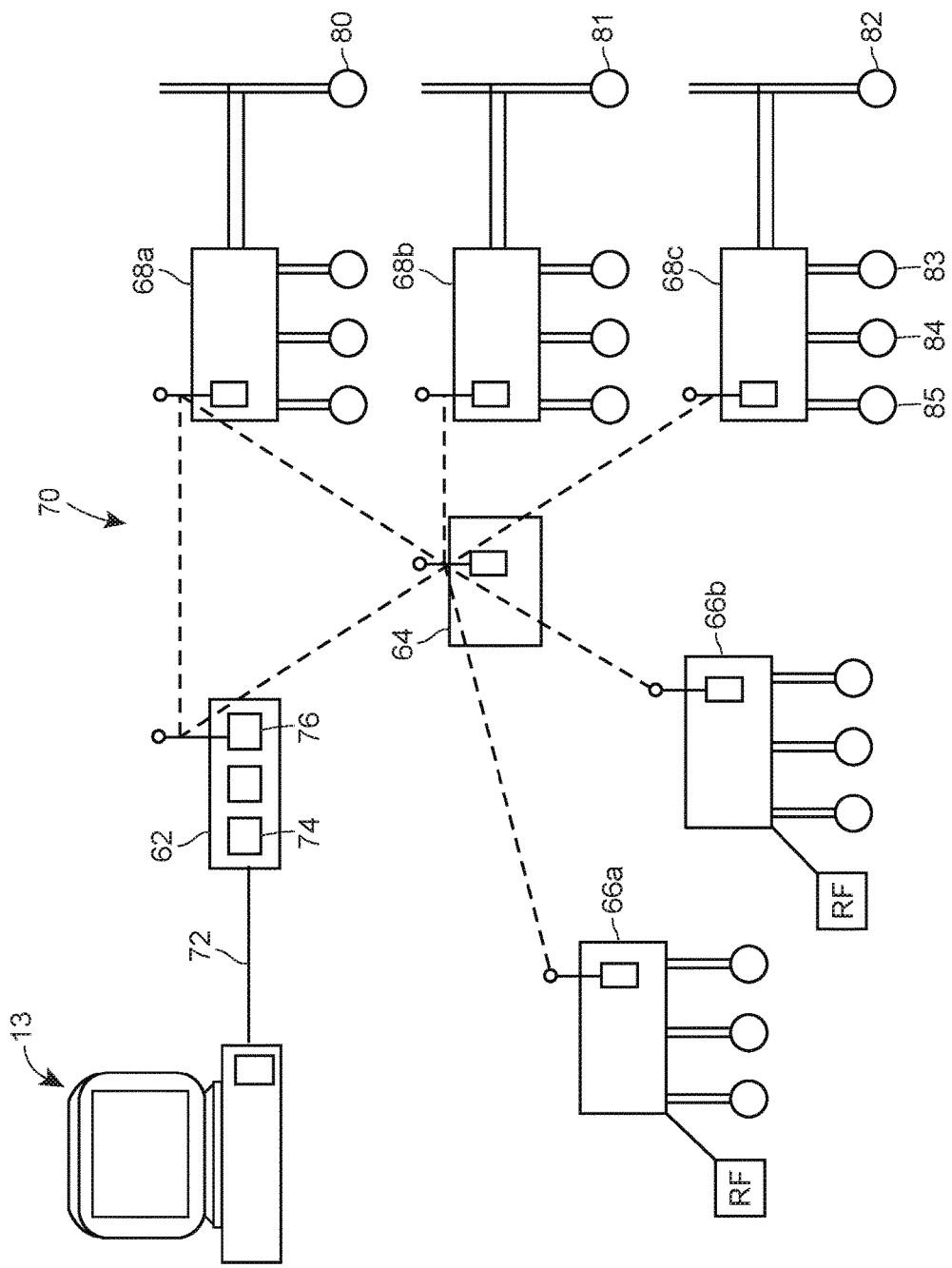
FIG. 2 is a combined block and schematic diagram of a wireless communication network within a portion of a process environment in accordance with this disclosure.

FIG. 2 illustrates one example of the wireless communication network 70 of FIG. 1 that may be used to provide communications between the different devices and, in particular, between the controllers 11 (or the associated I/O devices 26, 28) of FIG. 1 and the field devices 40-50, between the controllers 11 and the host workstations 13 or between the host workstations 13 and the field devices 40-50 of FIG. 1. However, it will be understood that the wireless communications network 70 of FIG. 2 could be used to provide communications between any other types or sets of devices within a process plant or a process environment.

The wireless communications network 70 of FIG. 2 is illustrated as including various communication nodes including one or more base nodes 62, one or more repeater nodes 64, one or more environment nodes 66 (illustrated in FIG. 2 as nodes 66a and 66b) and one or more field nodes 68 (illustrated in FIG. 2 as nodes 68a, 68b and 68c). Generally speaking, the wireless communications network 70 operates as a self-healing, mesh-type communication network (also referred to as a wireless mesh network), wherein each node receives a communication, determines if the communication is ultimately destined for that node and, if not, repeats or passes the communication along to any other nodes within communication range. Should a particular communication path become unavailable (e.g., due to a node communication failure), the gateway may established a new communication path. As is known, any node in a wireless mesh network may communicate with any other node in range to forward communications within the wireless mesh network, and a particular communication signal may go through multiple nodes before arriving at the desired destination.

As illustrated in FIG. 2, the base node 62 includes or is communicatively coupled to a work station or a host computer 13 which may be for example any of the hosts or workstations 13 of FIG. 1. While the base node 62 is illustrated as being linked to the workstation 13 via a hardwired Ethernet connection 72, any other communication link may be used instead. The base node 62 includes a wireless conversion or communication unit 74 and a wireless transceiver 76 to effect wireless communications over the network 70. In particular, the wireless conversion unit 74 takes signals from the host computer 13 and encodes these signals into a wireless communication signal which is then sent over the wireless communications network 70 via the transmitter portion of the transceiver 76. Conversely, the wireless conversion unit 74 decodes signals received via the receiver portion of the transceiver 76 to determine if that signal is destined for the base node 62 and, if so, further decodes the signal to strip off the wireless encoding to produce the original signal generated by the sender at a different node 64, 66 or 68 within the network 70.

As will be understood, in a similar manner, each of the other communication nodes including the repeater nodes 64, the environmental nodes 66 and the field nodes 68 includes a communication unit and a wireless transceiver (not shown) for encoding, sending and decoding signals sent via the wireless mesh network 70. While the different types of nodes 64, 66, 68 within the communication network 70 differ in some important ways, each of these nodes generally operates to receive wireless signals, decode the signal enough to determine if the signal is destined for that node (or a device connected to that node outside of the wireless communications network 70), and repeat or retransmit the signal if the signal is not destined for that node and has not previously been transmitted by that node. In this manner, signals are sent from an originating node to one or more the nodes within wireless communication range, each of the nodes in range which are not the destination node then retransmits the signal to one or more of the other nodes within range of that node, and the process continues until the signal has propagated to all of the nodes within range of at least one other node. However, the repeater node 64 operates to simply repeat signals within the wireless communications network 70 to thereby relay a signal from one node through the repeater node 64 to a second node 62, 66 or 68. Basically, the function of the repeater node 64 is to act as a link between two different nodes to assure that a signal is able to propagate between the two different nodes when these nodes are not or may not be within direct wireless communication range of one another. Because the repeater node 64 is not generally tied to other devices at the node, the repeater node 64 only needs to decode a received signal enough to determine if the signal is a signal that has been previously repeated by the repeater node (that is, a signal that was sent by the repeater node at a previous time and which is simply being received back at the repeater node because of the repeating function of a different node in the wireless communications network 70). If the repeater node 64 has not received a particular signal before, the repeater node 64 simply operates to repeat this signal by retransmitting that signal via the transceiver of the repeater node 64. It should be noted, however, that repeater nodes 64 may not be necessary within a wireless mesh network, provided there is a sufficient number of other nodes 66, 68 in communication with one another to avoid isolated nodes and/or pinch points, and the other nodes 66, 68 may function in a manner similar to the repeater node to decode a signal enough to determine if the signal is simply repeated back or meant for the node.

That is, when a node must rely upon a single node or a limited number of nodes to route messages to the base node 62, a pinch point (also known as a communication bottleneck) may occur within the network. Repeater nodes 64 may be used to alleviate pinch points or the risk of pinch points (i.e., the risk of a pinch point occurring if a node 66, 68 fails).

On the other hand, each of the field nodes 68 is generally coupled to one or more devices within the process plant environment and, generally speaking, is coupled to one or more devices, illustrated as field devices 80-85 in FIG. 2. Similar to FIG. 1, the field devices 80-85 may be any type of field devices including, for example, four-wire devices, two-wire device, HART devices, WirelessHART® devices, Fieldbus devices, 4-20 mA devices, smart or non-smart devices, etc., such as the devices 40-50 of FIG. 1. For the sake of illustration, the field devices 80-85 of FIG. 2 are illustrated as HART field devices, conforming to the HART communication protocol. Of course, the devices 80-85 may be any type of device, such as a sensor/transmitter device, a valve, a switch, etc., such as field devices. Additionally, the devices 80-85 may be other than traditional field devices such as controllers 12, I/O devices 22A-20B, work stations 14, or any other types of devices. It should also be understood that a field node 68 (as well as the nodes 66) may be integrated with the device to which it corresponds, thereby creating a wireless device, such as wireless controllers, wireless I/O devices, wireless workstations, wireless field devices, etc.

In any event, the field node 68a, 68b, 68c includes signal lines attached to their respective field devices 80-85 to receive communications from and to send communications to the field devices 80-85. Of course, these signal lines may be connected directly to the devices 80-85, in this example, a HART device, or to the standard HART communication lines already attached to the field devices 80-85. If desired, the field devices 80-85 may be connected to other devices, such as I/O devices 26, 28 of FIG. 1, or to any other desired devices via hardwired communication lines in addition to being connected to the field nodes 68a, 68b, 68c. Additionally, as illustrated in FIG. 2, any particular field node 68a, 68b, 68c may be connected to a plurality of field devices (as illustrated with respect to the field node 68c, which is connected to four different field devices 82-85) and each field node 68a, 68b, 68c operates to relay signals to and from the field devices 80-85 to which it is connected.

In order to assist in the management in the operation of the wireless communications network 70, the environmental nodes 66 are used. In this case, the environmental nodes 66a and 66b includes or is communicatively connected to devices or sensors that measure environmental parameters, such as the humidity, temperature, barometric pressure, rainfall, or any other environmental parameters which may affect the wireless communications occurring within the wireless communications network 70. This information may be useful in analyzing and predicting problems within the wireless communications network 70, as many disruptions in wireless communications are at least partially attributable to environmental conditions. If desired, the environmental sensors may be any kind of sensor and may include, for example, HART sensors/transmitters, 4-20 mA sensors or on board sensors of any design or configuration. Of course, each environmental node 66a, 66b may include one or more environmental sensors and different environmental nodes may include the same or different types or kinds of environmental sensors if so desired. Likewise, if desired, one or more of the nodes 66a, 66b may include an electromagnetic ambient noise measurement device to measure the ambient electromagnetic noise level, especially at the wavelengths used by the wireless communications network 70 to transmit signals. Of course, if a spectrum other an RF spectrum is used by the wireless communications network 70, a different type of noise measurement device may be included in one or more of the environmental nodes 66. Still further, while the environmental nodes 66 of FIG. 2 are described as including environmental measurement devices or sensors, any of the other nodes 68 could include those measurement devices so that an analysis tool may be able to determine the environmental conditions at each node when analyzing the operation of the wireless communications network 70.

It will be noted that FIG. 2 is a schematic diagram and the placement of the environmental nodes 66a, 66b relative to the field nodes 68a-68c are not intended to be relative to their actual placement in an actual process control environment. Rather, the environmental nodes 66a, 66b (and other environmental nodes not pictured or a single environmental node) are intended to be placed about the process control environment in a logical and strategic manner as shown conceptually in FIGS. 3 and 4.

Figure 3:
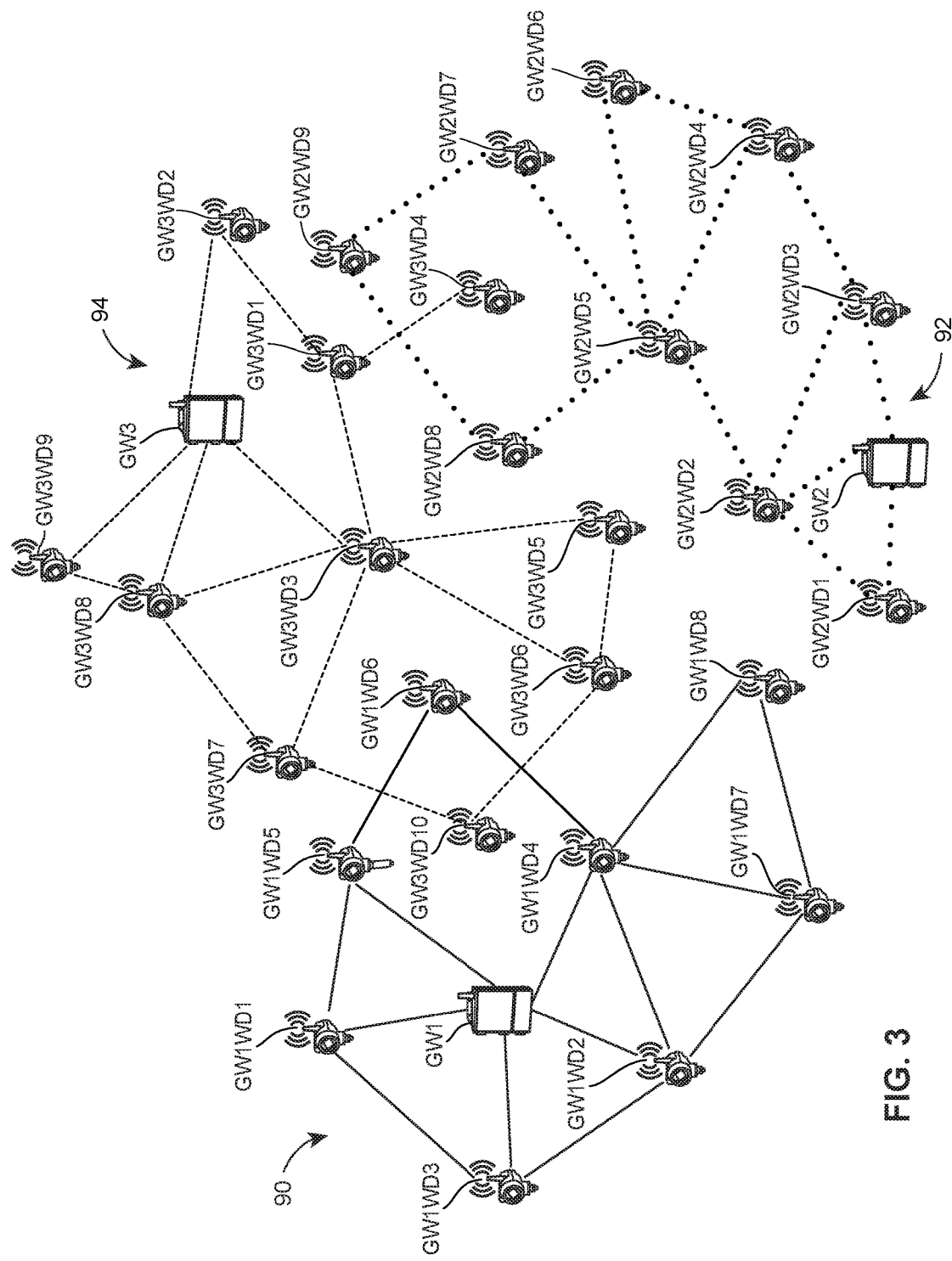
FIG. 3 is a schematic diagram of multiple wireless mesh networks within a portion of a process environment, in which each wireless mesh network includes a gateway and a plurality of wireless nodes corresponding to various field devices in accordance with this disclosure.

FIG. 3 is a further conceptual illustration of multiple wireless communications networks shown as wireless mesh network 90 (with the communication paths shown in solid lines), wireless mesh network 92 (with the communication paths shown in dotted lines), and wireless mesh network 94 (with the communication paths shown in dashed lines), each with a wireless gateway GW1-GW3 in communication with wireless nodes which correspond to various field devices, such as field devices 40-50, and controllers, such as controllers 11, where the gateway and wireless nodes in communication with the gateway make up a wireless mesh network. The field devices (and controllers) to which the nodes correspond are generally considered smart-measurement, wireless-enabled process devices, enabled as wireless either by wireless adapters 52a, 52b or by being wireless field devices. Because the field devices and controllers are wireless-enabled process devices, they communicate within each wireless mesh network and with the workstation 13, server 24 and or a computing device connected to the access point 23 as shown in FIG. 1 via the gateway. Thus, as with traditional hardwired networks, the wireless-enabled process devices are able to exchange process data with the workstation 13, server 24, etc., and in a wireless mesh configuration, each wireless-enabled field device and controller serves not only as a client to receive and send its own data, but also as a repeater or relay to propagate data through the network to other process devices. Thus, each wireless-enabled field device and controller is a wireless node within the wireless mesh network.

The wireless gateway and wireless nodes communicate using a wireless communication protocol, such as the WirelessHART® protocol (IEC 62591), although other wireless protocols may also be used. WirelessHART® protocol is a time division multiple access (TDMA) channel access and channel hopping for communication within the wireless mesh network. Network manager software may be implemented on each wireless gateway or a workstation 13 in order to schedule communications among the wireless nodes and the wireless gateway, and define communication paths within the wireless mesh network. Although FIG. 3 shows each wireless mesh network 90, 92, 94 with only a single gateway, more than one gateway may be provided, in which case the gateways may share network manager software. Likewise, although only a limited number of wireless nodes are shown, each wireless mesh network 90, 92, 94 can easily have dozens or hundreds of nodes making up each network. Similarly, although only three wireless mesh networks 90, 92, 94 are shown, a process plant 10 may easily have dozens of wireless mesh networks or more.

Each wireless mesh network is, in turn, connected to host workstations or computers, servers, and other computing devices, similar to the network 70 connected to the host workstations or computers 13, and/or servers 24 via a communication link in FIG. 1. Each gateway may correspond to the base node 62 above, and interfaces the wireless mesh network with the host workstations 13 and/or servers 24 via the Ethernet connection 72 using a number of different protocols, such as those mentioned above. As such, while the wireless gateway may be linked to the workstation 13 via the hardwired Ethernet connection, any other communication link may be used instead, such as a wireless communication link, examples of which were provided above.

Although not necessarily representative of the placement of the wireless nodes and wireless mesh networks relative to their actual placement in an actual process control area, FIG. 3 does conceptually represent the placement of the wireless nodes GW1WD1-GW1WD9, GW2WD1-GW2WD10 and GW3WD1-GW3WD9 relative to one another and relative to each wireless gateway GW1, GW2 and GW3, and, in turn, conceptually represents the placement of each of the three wireless mesh networks 90, 92, 94 relative to one another. For example, in a wireless mesh network 90 relative to the wireless gateway GW1, wireless node GW1WD1 is closest, wireless node GW1WD3 is the next closest, then wireless node GW1WD2, etc. In turn, relative to wireless node GW1WD1, gateway GW1 is the closest, wireless node GW1WD5 is the next closest, and wireless node GW1WD3 is the next closest thereafter, and so on and so forth with every node in the wireless mesh network 90. In the wireless mesh network 92 relative to the wireless gateway GW2, wireless node GW2WD3 is the closest, wireless node GW2WD2 is the next closest, and then wireless node GW2WD1, and so on with every nodes in the wireless mesh network 92. Similarly, in the wireless mesh network 94 relative to the wireless gateway GW3, wireless node GW3WD1 is closest, wireless node GW3WD8 is the next closest, then wireless node GW3WD9, etc., and so on with every nodes in the wireless mesh network 94. Note, only those wireless nodes that are in direct communication are considered as being neighbors to one another.

Likewise, the wireless mesh networks 90, 92, 94 are relative to one another, and the wireless nodes of one network relative to the wireless nodes of a different wireless mesh network. For example, wireless mesh networks 90 and 94 "overlap" one another in terms of coverage area, and wireless mesh networks 92 and 94 overlap one another. It should also be noted that while FIG. 3 depicts the wireless mesh networks in two dimensions, in practice a wireless mesh network may be spread in all three dimensions such that wireless nodes may be above or below the horizontal level of the gateway and/or neighboring wireless nodes. In addition, wireless nodes may be proximate one another as to normally be considered neighbors, but are otherwise unable to establish a communication link with one another due to some form of electromagnetic and/or structural interference.

As is known, each gateway GW1, GW2, GW3 may collect information about its wireless mesh network 90, 92, 94, including information about each wireless node in the wireless mesh network. For example, as mentioned above with respect to a wireless mesh network 70, network manager software may be used to schedule communications and define communication paths within the wireless mesh networks 90, 92, 94. In particular, the network manager defines communication paths for messages transmitted from the gateway to the various wireless nodes, and vice versa. The communication paths are assigned by the network manager using information received from each of the wireless nodes. As each wireless node is introduced into the network, the wireless node communicates with other wireless nodes within range to determine its neighbors (i.e., other wireless nodes or the gateway in direct active communication with the wireless node). Each wireless node measures the received signal strength, referred to as the received signal strength indicator (RSSI) which is a measure of the power of a received signal, during each communication with a neighbor, among other statistics regarding communications with its neighbors.

Information about each node's neighbors and corresponding RSSI may be transmitted to the gateway 90, 92, 94 and used by the network manager software. For example, the network manager software may use the neighbor information and RSSI information to determine the communication paths for incoming and outgoing messages between the gateway and each of the wireless nodes. For each communication path, the network manager software identifies the neighboring nodes for the various hops in the route. The wireless nodes within a communication path may be classified as a parent or a child, where a parent is a device that passes communications through itself for another device (its child), and a child is a device that communicates through another device (a parent) to reach a third device or gateway.

Each of wireless nodes GW1WD1-GW1WD9, GW2WD1-GW2WD10 and GW3WD1-GW3WD9 periodically reports its communication statistics to the corresponding gateway 90, 92, 94. These statistics are used by the network manager software to determine communication paths and assign time slots for messages. The communication statistics may include identification of neighbors, received signal strength indicators (RSSI) from each neighbor, received signal strength indicators (RSSI) to each neighbor, the percentage of successful communications with each neighbor, number of parents and children to that particular node, parent-to-children ratio, parent-to-neighbor ratio, and children-to-neighbor ratio, whether the wireless node is within range of a gateway, and whether the wireless node is in direct communication with the gateway. Additionally, each wireless node may report an indication of its battery condition, such as remaining charge, battery stability, recharge rate/time, and other battery diagnostics.

In addition, using diagnostic tools, such as the network manager software, pinch points (i.e., a wireless node whose failure would result in at least one other wireless node no longer having a communication path to the gateway) may be identified within a wireless mesh network. As one example, the network manager software may utilize a pinch point diagnostic tool to determine pinch points within the mesh network. An example of a pinch point analysis is disclosed in U.S. Application Publication No. 2011/0164512 entitled "Wireless Mesh Network With Pinch Point and Low Battery Alerts," the contents of which are expressly incorporated by reference herein. As disclosed therein, there are several methods for determining pinch points within a network. For example, best practice for the minimum number of neighbors for the gateway may be used as an indication of a pinch point condition (e.g., if fewer than five devices communicate directly with (or are in range of) the gateway, or if less than a percentage of all wireless nodes in the mesh network are within range of the gateway). It is noted however, that this indicates the presence of a possible pinch point, but not necessarily which wireless node(s) is acting as a pinch point.

Another method of identifying pinch points utilizes a maximum number of neighbors for each wireless node. If a particular wireless node has a large number of neighbors (e.g., greater than a threshold number), this may indicate that it is a pinch point.

A further method of identifying a pinch point utilizes the parent-to-children ratio, parent-to-neighbor and/or child-to-neighbor ratio of each wireless node. A pinch point may be identified if the wireless node has an unusually large or unusually small parent-to-children ratio, parent-to-neighbor ratio or child-to-neighbor ratio. The statistical deviation of the parent-to-children ratio parent-to-neighbor ratio or child-to-neighbor ratio from average values within the network can also be used as an indication of a pinch point. In addition, the statistical deviation of the number of neighbors at a particular wireless node with respect to the average number of neighbors for each wireless node within the network may indicate that the particular wireless node is a pinch point.

Figure 4:
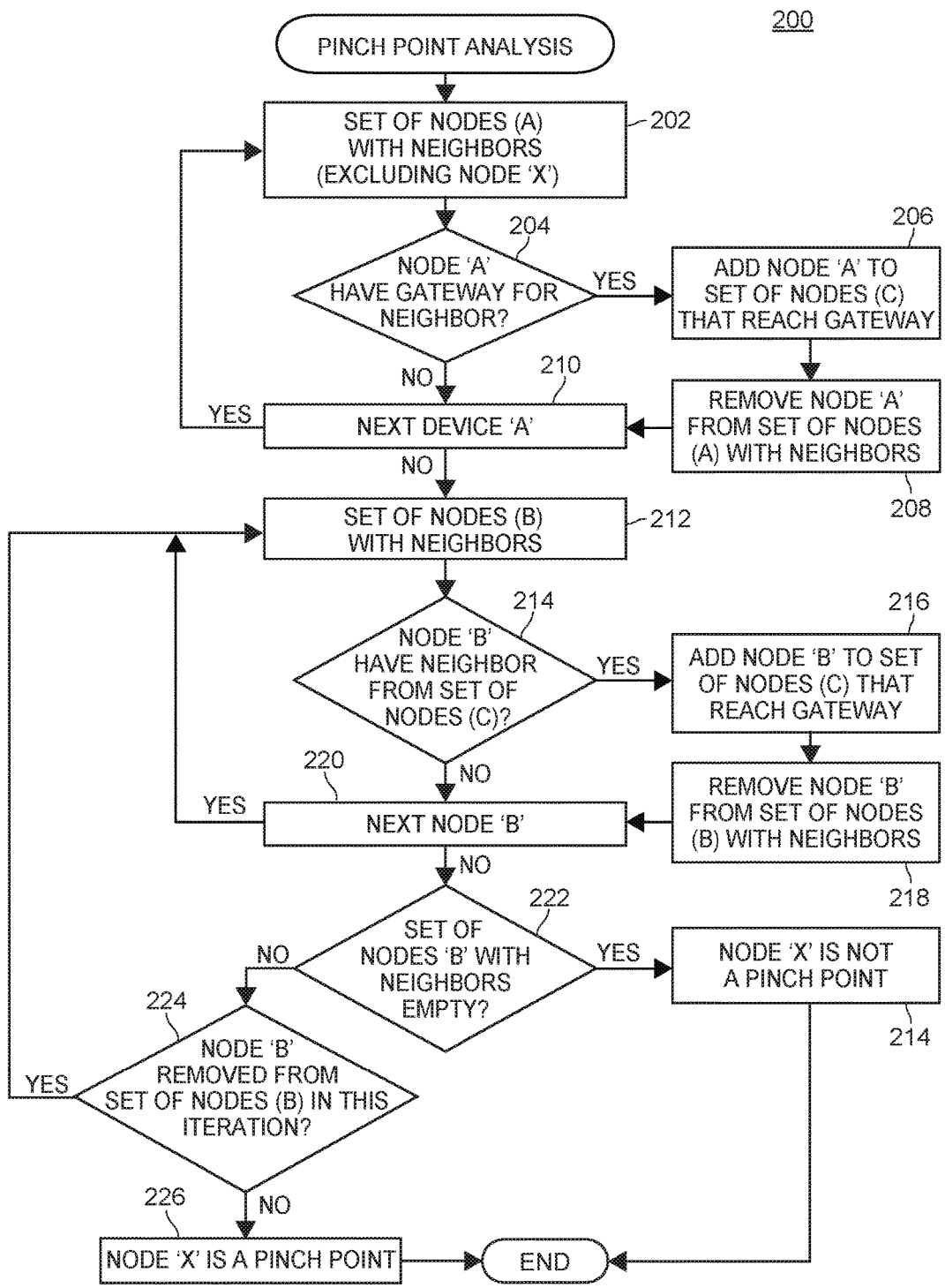
FIG. 4 is a flowchart of a pinch point analysis routine to identify pinch points within the wireless mesh network and wireless nodes dependent upon the pinch points in accordance with this disclosure.

A still further method to identify pinch points is shown with respect to FIG. 4, which uses neighbor information provided by the wireless nodes to identify pinch points based on communication paths between the wireless nodes and the gateway, without requiring parent/child information for the device. FIG. 4 is a flowchart of a pinch point analysis routine 200 showing the evaluation of each wireless node 'X' within the mesh network to determine whether it is a pinch point. In evaluating wireless node 'X', the routine accesses a set of wireless nodes (A) having neighbors, excluding the wireless node 'X' under evaluation at block 202. For each wireless node 'A' in the set, the routine 200 begins with the assumption that none of the wireless nodes 'A' can reach the gateway. For each wireless node 'A' in the set of wireless nodes (A) with neighbors, the routine 200 determines whether the wireless node 'A' has the gateway as a neighbor at block 204. If the wireless node 'A' has the gateway as a neighbor (i.e., communicates directly with the gateway), the wireless node 'A' is added to a set of wireless nodes (C) that are able to communicate with the gateway at block 206. In addition, the wireless node 'A' is removed from the set of wireless nodes (A) that cannot reach the gateway at block 208. The routine 200 then proceeds to the next wireless node 'A' within the set at block 210. Alternatively, if the wireless node 'A' at block 204 does not have the gateway as a neighbor, routine 200 proceeds to the next wireless node 'A' at block 210. If there is another wireless node 'A' to test, the routine 200 returns to block 202 and repeats the process. This continues until the last wireless node 'A' has been evaluated.

Having evaluated each of the wireless nodes 'A' as above and removed those that have the gateway as a neighbor, a resulting set of wireless nodes (B) at block 212 are those wireless nodes from the set of wireless nodes (A) with neighbors that do not include the gateway. That is, the resulting set of wireless nodes (B) are those that do not have the gateway as a neighbor and are still assumed to not be able to reach (i.e., communicate with) the gateway indirectly.

The routine 200 then proceeds to test each wireless node 'B' in the set of wireless nodes (B) at block 214 which cannot reach the gateway. In particular, the routine 200 determines if the wireless node 'B' has a neighboring wireless node 'C' in the set of wireless nodes (C) that are able to reach the gateway. If wireless node 'B' does have a neighbor in the set of wireless nodes (C) which can reach the gateway, wireless node 'B' is considered to be in indirect communication with the gateway, and wireless node 'B' is added to the set of wireless nodes (C) which can reach the gateway at block 216. In addition, the wireless node 'B' is removed from the set of wireless nodes (B) that cannot reach the gateway at block 218. The routine 200 then proceeds to the next wireless node 'B' within the set at block 220. Alternatively, if the wireless node 'B' at block 214 does not have a neighbor from the set of wireless nodes (C), the routine 200 proceeds to the next wireless node 'B' at block 220. If there is another wireless node 'B' to test, the routine 200 returns to block 212 and repeats the process. This continues until the last wireless node 'B' in the set of wireless nodes (B) has been evaluated.

Having evaluated each of the wireless nodes 'B' as above and removed those that have a wireless node 'C' as a neighbor, the routine 200 determines whether the set of devices (B) which cannot reach the gateway is empty at block 222. If the answer is yes, wireless node X is not considered a pinch point at block 214, because the routine 200 has determined that all wireless nodes except wireless node 'X' are able to communicate with the gateway, and the routine 200 for wireless node 'X' ends.

On the other hand, if the set of wireless nodes (B) which cannot reach the gateway is not empty as determined at block 222, the routine 200 determines whether a wireless node 'B' was removed from the set of wireless nodes (B) that cannot reach the gateway in the latest iteration at block 224. If the answer is yes, the routine 200 returns to block 212 to evaluate if any of the remaining wireless nodes 'B' now has a wireless node C as a neighbor, the set of wireless nodes (C) being updated each time a wireless node 'B' is removed from the set of wireless nodes (B) and added to the set of wireless nodes (C). If the answer is no, the wireless node X under evaluation is identified as a pinch point at block 226, as the wireless nodes remaining in the set of wireless nodes (B) cannot reach the gateway without the wireless node X. At that point, the routine 200 ends. The process illustrated in FIG. 4 is repeated for each wireless node X that is identified as having neighbors within mesh network 16. When all wireless nodes have been evaluated using the routine 200 of FIG. 4, the result is a complete set of wireless nodes identified as pinch points within the mesh network.

As field devices and controllers are implemented within a process control system, wireless nodes are added to the networks. Likewise, field devices and controllers may be taken offline or removed from the process control system, thus removing wireless nodes from the wireless mesh networks. As wireless nodes are added or removed from a network, the communication paths may change. Accordingly, each gateway, host computer 13 and/or server 24 may periodically gather information about the wireless mesh network using various diagnostic tools in order to identify, define and/or update the communication paths therein. However, as wireless nodes may be added or taken offline, and communication paths changed, the topology of each wireless mesh network changes. In turn, a wireless mesh network may develop connectivity issues, such as pinch points, network load imbalance or violations of best practices.

For example, referring back to FIG. 3, wireless node GW3WD1 is a pinch point with respect to wireless node GW3WD4. That is, GW3WD4 is dependent solely upon GW3WD1 for communications within the wireless mesh network 94. A pinch point, by itself, may decrease the communication reliability of wireless nodes that communicate through the pinch point, and limit bandwidth for wireless nodes that communication through the pinch point.

Further, a pinch point may consume additional power to transmit the increased communications load, which may lead to quicker depletion of the battery level for battery-powered wireless nodes, which, in turn, leads to a communication device failure in the pinch point and communication device failures for wireless nodes GW3WD4 dependent upon the pinch point GW3WD1 to reach the gateway GW3.

As another example, a best practice rule to maintain a robust, self-healing mesh network may have a standard where each gateway should have at least five neighbors, and each wireless node should have at least three neighbors. In the mesh networks 90, 92, 94 of FIG. 3, the gateway GW2 has fewer than five neighbors, and wireless nodes GW1WD6, GW1WD8, GW2WD1, GW2WD8, GW2WD9, GW3WD2, GW3WD4, GW3WD5, GW3WD9 and GW3WD10 each have fewer than three neighbors. Of course, other standards may be applied to determine the topology of the wireless mesh network depending on the particular best practice requirements. Further, it may not always be possible to comply with the best practice rules, but nonetheless maintenance efforts are made to the extent possible to adhere to the best practice rule.

Figure 5:
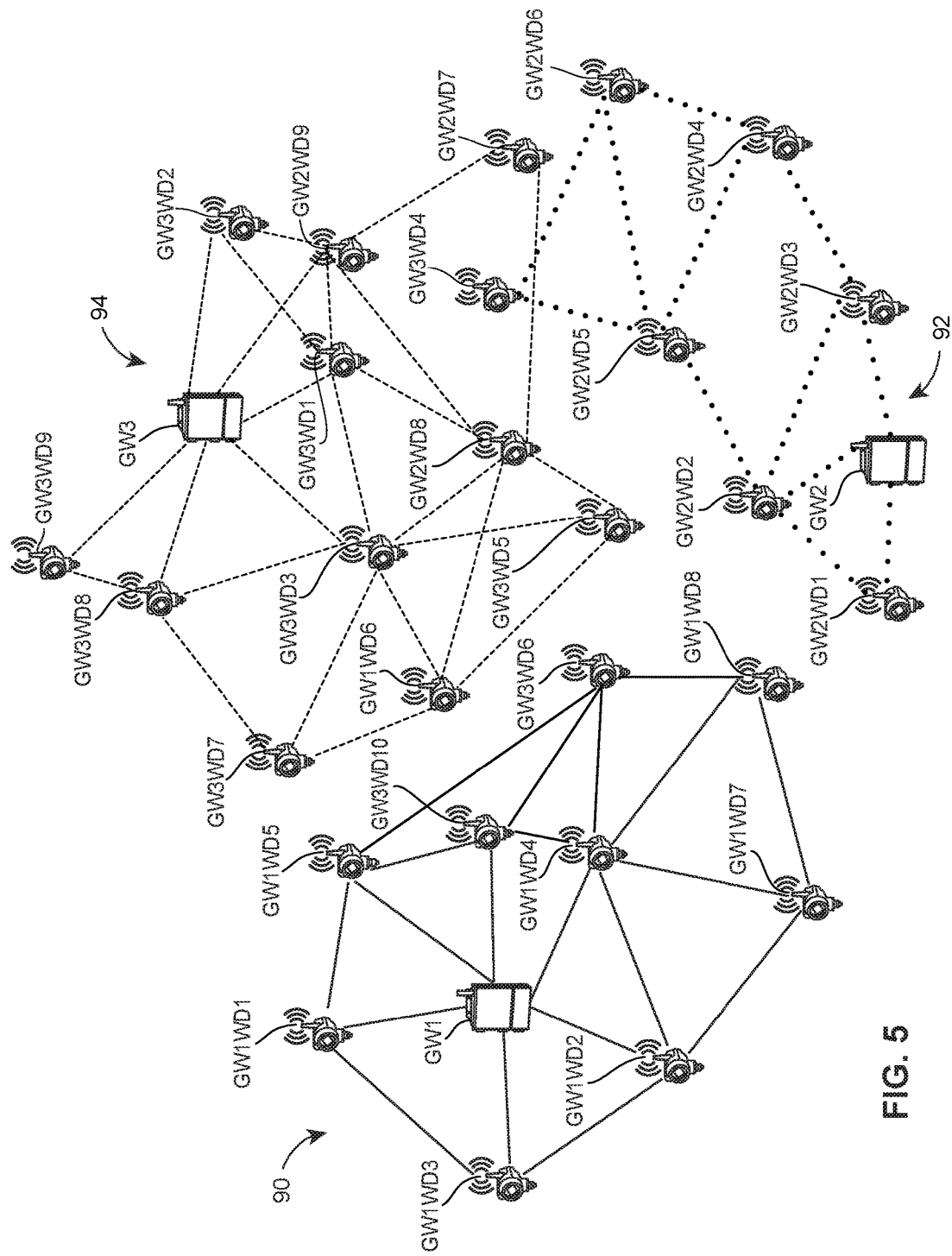
FIG. 5 is a schematic diagram of the wireless mesh networks of FIG. 3, in which wireless nodes have been logically transferred between networks in accordance with this disclosure.

In order to maintain the wireless mesh networks 90, 92, 94, the topology of each network may be periodically analyzed to identify connectivity issues, such as pinch points, load imbalances and best practice violations. As a result of such analyses, a plan may be developed to reconfigure each of the wireless mesh networks, which includes logically transferring wireless nodes from one wireless mesh network to another wireless mesh network. FIG. 5 depicts an example of a reconfiguration of the wireless mesh networks 90, 92, 94. In particular, wireless nodes GW3WD10 and GW3WD6 have been logically transferred to the wireless mesh network 90. That is, the physical position of wireless nodes GW3WD10 and GW3WD6 has not changed relative to what is depicted in FIG. 3. Further, in response to a transfer command from gateway GW3, GW3WD10 has ceased direct communications with its neighbor GW3WD7 in wireless mesh network 94, and has established direct communications with its new neighbors GW1WD1, GW1WD4, GW1WD5, GW3WD6 and indirect communication with the gateway GW1 in wireless mesh network 90. Similarly, in response to a transfer command from gateway GW3, GW3WD6 ceased communications with neighbors GW3WD3 and GW3WD5 in wireless mesh network 94, and established direct communications with GW1WD4, GW1WD5, GW1WD8 and GW3WD10, and indirect communication with the gateway GW1. In addition, the reconfiguration logically transfers wireless node GW3WD4 from wireless mesh network 94 to wireless mesh network 93, logically transfers wireless node GW1WD6 from wireless mesh network 90 to wireless mesh network 94, and logically transfers wireless nodes GW2WD7, GW2WD8 and GW2WD9 from wireless mesh network 92 to wireless mesh network 94. As seen in FIG. 5, this eliminates the pinch points that were present in the configuration of FIG. 3. Moreover, although there still exist some best practice violations (i.e., GW3WD9, GW2WD7, GW3WD4, GW2WD1 and GW2), many of the connectivity issues are accounted for in the reconfiguration of FIG. 5 including load imbalances and pinch points, and each of mesh networks 90, 92, 94 may be considered more robust overall.

In order to logically transfer the wireless nodes GW1WD6, GW2WD7, GW2WD8, GW2WD9, GW3WD4, GW3WD6 and GW3WD10 in a manner that reduces network (and process system) downtime and minimizes disruption of other wireless nodes, the transfer of the nodes should follow a particular sequence. That is, if the wireless nodes for transfer are not transferred in the appropriate sequence, the transfer of a wireless node to another network may leave another wireless node(s) isolated from the gateway in the source wireless mesh network (i.e., the network from which the wireless node is being transferred). Similarly, if a wireless node is transferred to another network before another wireless node, the transferred wireless node may be isolated from the gateway of the destination wireless mesh network (i.e., the network to which the wireless node is being transferred).

For example, comparing FIGS. 3 and 5, if the transfer is not sequenced properly, the wireless nodes GW2WD8 and GW2WD7 might transferred to wireless mesh network 92 before GW2WD9. This would isolate GW2WD9 from the gateway GW2, in which case the gateway GW2 would be unable to send a transfer command to wireless node GW2WD9 to transfer to wireless mesh network 94. On the other hand, if wireless node GW2WD7 is transferred to wireless mesh network 94 before either GW2WD8 and GW2WD9, and after GW3WD4 is transferred to wireless mesh network 92, wireless node GW2WD7 would be isolated from the gateway GW3. Although these issues may be ultimately resolved, it nonetheless results in system downtime and disruption in communication for other wireless nodes that may otherwise be avoided with a proper transfer sequence. The sequencing may be performed by the network manager, where the network manager is shared among the wireless mesh networks 90, 92, 94. Alternatively, the sequencing may be performed by a different centralized entity that may communicate with each of the wireless mesh networks 90, 92, 94, such as the server 24 or workstation 13.

Figure 6:
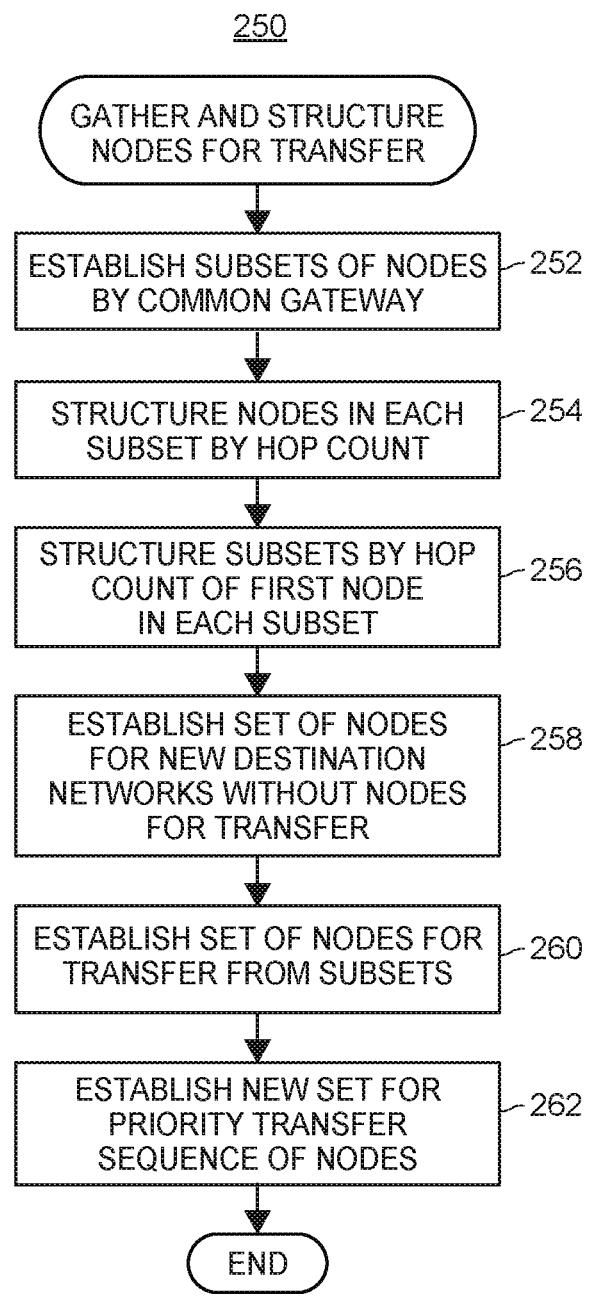
FIG. 6 is a flowchart of a gathering and structuring routine to create a set and subsets of wireless nodes to be transferred between wireless mesh networks in accordance with this disclosure.

In order to sequence the transfer of multiple wireless nodes among multiple wireless mesh networks, the wireless nodes for transfer may be gathered and structured in subsets, that are, in turn, structured in a set. FIG. 6 depicts a routine 250 for gathering and structuring the wireless nodes GW1WD6, GW2WD7, GW2WD8, GW2WD9, GW3WD4, GW3WD6 and GW3WD10 for logical transfer between wireless mesh networks 90, 92, 94. Generally speaking, the gathering and structuring routine 250 provides structure in order to evaluate the wireless nodes for transfer in a manner that is balanced across the multiple wireless mesh networks, such that, for example, no one wireless mesh network has most or all wireless nodes transferred before any wireless nodes are transferred in.

Given that wireless nodes that are furthest away from the gateway are usually more dependent upon (i.e., children of) other wireless nodes for communication and less likely to be depended upon by (i.e., parents of) other wireless nodes for communication, the routine 250 utilizes the hop count (i.e., the number of intermediate wireless nodes though which data must pass from the gateway) of each wireless node to structure the wireless nodes into subsets. Because the wireless mesh networks are often self-organizing, self-healing mesh networks, there may be multiple communication paths between a gateway and a wireless node. For the purpose of this routine, the shortest communication path is utilized. For example, wireless node GW2WD9 has one communication path with the gateway GW2 via GW2WD8-GW2WD5-GW2WD2 and another communication path with the gateway GW2 via GW2WD7-GW2WD6-GW2WD4-GW2WD3. The first communication path has three hops, whereas the second communication path has four hops. Thus, the first communication path is utilized for the routine 250, such that wireless node GW2WD9 is three hops away from the gateway GW2.

In another example, the commonly used diagnostic tool traceroute determines the route of communications in the network and measures transit delays of messages across the network. As is generally known, traceroute sends a sequence of echo request packets addressed to a destination node. Traceroute determines the intermediate nodes traversed in the communication path by adjusting time-to-live (TTL) (hop limit) network parameters. The TTL (hop limit) value is decremented at each node in the communication path, a packet is discarded when the TTL value has reached zero, and an error message returned to the message origin indicating time exceeded. The TTL value (hop limit) is increased for each successive set of packets sent, where a first set of packets have a hop limit value of 1 with the expectation that they are not forwarded on by the first node. The first node then returns the error message back to the origin. The next set of packets have a hop limit value of 2, so that they are not forwarded beyond the second node in the communication path, and the second node sends the error reply. This continues until the destination node receives the packets and returns an echo reply message. Traceroute uses the returned messages to produce a set of nodes that the packets have traversed. The timestamp values returned for each node along the path are the delay (latency) values, typically measured in milliseconds. Thus, the number of hops and latency values may be determined for the network, and, in turn, the communication path may be determined for the network. The number of hops determined from this diagnostic tool may be used as the hop count for the wireless nodes to be transferred.

Table 1 below shows the wireless nodes for transfer, the source wireless mesh network, the destination wireless mesh network, and the hop count. The wireless mesh networks are designated by gateway.

TABLE 1

| Wireless Node for Transfer | Source Wireless Mesh Network | Destination Wireless Mesh Network | Hop Count |
|---|---|---|---|
| GW1WD6 | GW1 | GW3 | 2 |
| GW2WD7 | GW2 | GW3 | 2 |
| GW2WD8 | GW2 | GW3 | 2 |
| GW2WD9 | GW2 | GW3 | 3 |
| GW3WD4 | GW3 | GW2 | 1 |
| GW3WD6 | GW3 | GW1 | 2 |
| GW3WD10 | GW3 | GW1 | 3 |

As an initial step to gather and structure the wireless nodes, the routine 250 establishes subsets of wireless nodes for transfer according to a common gateway of the source wireless mesh networks at block 252. Thus, wireless node GW1WD6 as the only wireless node for transfer from wireless mesh network 90 would be in its own subset with GW1 as a gateway. GW2WD7, GW2WD8 and GW2WD9 from wireless mesh network 92 each have gateway GW2 in common, and are in another subset. GW3WD4, GW3WD6 and GW3WD10 from wireless mesh network 94 each have gateway GW3 in common for a third subset. FIG. 7A is a representation of the subsets of wireless nodes for transfer structured into different subsets according to common gateway. It is noted that in this type of set and subsets, the subsets are considered proper subsets of the set, in that all elements of each subset are in the set, but no subset is equal to the set.

In turn, each wireless node is structured in the respective subset according to hop count from highest to lowest at block 254. For example, referring to FIG. 7B, in each subset the wireless nodes are structured according to hop count with the respective gateway of the source wireless mesh network. Thus, for the subset defined by the gateway GW2, the wireless nodes for transfer are structured as GW2WD9 (3 hops), GW2WD8 (2), GW2WD7 (2). Similarly, for the subset defined by the gateway GW3, the wireless nodes for transfer are structured as GW3WD10 (3), GW3WD6 (2), GW3WD4 (1). For the gateway GW1, there is, again, only one wireless node for transfer.

Referring back to FIG. 6, once the wireless nodes are structured in each subset according to hop count with the gateway of the source wireless mesh network, the routine 250 structures the set of subsets by the hop count of the first wireless node in each subset at block 256. For example, referring to FIG. 7C, the subset associated with gateway GW2 is structured in the set first, given that the first wireless node for transfer therein is GW2WD9 with a hop count of three. The subset associated with gateway GW3 is structured in the set next based on the hop count of wireless node GW3WD10, and then the subset with gateway GW1. As seen in FIGS. 7B and 7C, the subsets associated with both gateways GW2 and GW3 both have first wireless nodes with the same hop count (i.e. 3), though the subset associated with gateway GW2 is structured ahead of the subset associated with gateway GW3 in FIG. 7C. In one embodiment, in order to determine which subset is structured first when multiple subsets have a first wireless node having the same hop count, the structuring at block 256 may continue to compare wireless node hop counts in the order of the subsets, until a wireless node from one subset has a greater hop count than a corresponding wireless node from another subset. For example, in FIGS. 7B and 7C, the next wireless node in the subset associated with gateway GW2 (i.e., GW2WD8) has the same hop count (i.e., 3) as the next wireless node in the subset associated with gateway GW3 (i.e., GW3WD6). As such, the routine 250 at block 256 compares the next wireless node in each subset (i.e., GW2WD7 and GW3WD4), in which case the wireless node in the subset associated with gateway GW2 has a higher hop count (i.e., 2) than the wireless node in the subset associated with gateway GW3 (i.e., 1). As such, the subset associated with gateway GW2 is structured ahead of the subset associated with gateway GW3. However, if either subset has no more wireless nodes to compare, then the other subset with more wireless node is structured first. In the event both subsets have no more wireless nodes to compare, then either subset may be structured first.

Having structured the wireless nodes for transfer, the routine 250 establishes another set of wireless nodes for the "new" wireless mesh networks without the wireless nodes for transfer at block 258. Referring to FIG. 7D, each of the wireless mesh networks as depicted by gateway corresponds to a subset that has therein the wireless nodes of the wireless mesh network that will not be transferred. This set of "new" wireless mesh networks is subsequently used and updated during the analysis of each wireless node for transfer, as disclosed further below.

At block 260, the routine 250 establishes an accumulated set of wireless nodes for transfer from the preceding steps. In particular, the routine 250 takes the subsets established and structured from blocks 252-256, and establishes the combination of the subsets as a set of wireless nodes for transfer, as shown in FIG. 7E. It is noted, however, that this is not necessarily the order in which the wireless nodes for transfer are evaluated for transfer sequence prioritization. Rather, this is the set of wireless nodes for transfer as defined by the multiple subsets structured as above. More particularly, this first set of wireless nodes for transfer is structured as subsets of wireless nodes for transfer having a common gateway, each wireless node ordered therein according to hop count with the gateway from highest to lowest, and then the subsets structured in the set according to the wireless node for transfer having the highest hop count in each subset. As such, FIG. 7E depicts the first set of wireless nodes for transfer as separated into the subsets that make up the first set, the wireless nodes of each subset being in communication with the same gateway of the source wireless mesh network, and structured therein according to a hop count of each wireless node's connection with the gateway. In turn, the subsets are structured in the first set according to the wireless node having the highest hop count in each subset.

At block 262, the routine 250 establishes a second set for the wireless nodes for transfer. This second set is initially a null set, as it does not contain any wireless nodes for transfer. However, as each wireless node for transfer passes evaluation, the wireless node is appended to the second set in order of priority of transfer. As such, once each wireless node for transfer has been evaluated and appended to the second set, the second set provides the sequence of transfer for the wireless nodes.

In order to evaluate each wireless node for transfer in the first set (e.g., FIG. 7E), a predictive analysis on the source wireless mesh network is performed to identify the impact of the transfer of the wireless node. Generally, the source wireless mesh network is analyzed without the wireless node under evaluation to identify any wireless nodes that are unable to communicate with the gateway. In addition, a predictive analysis on the wireless node under evaluation is performed to identify the impact of the transfer to the destination wireless mesh network on the wireless node itself. Generally, the wireless node under evaluation is analyzed as part of the destination network without any other wireless nodes to be transferred to identify whether the wireless node under evaluation is able to communicate with the gateway of the destination wireless mesh network. Provided the source wireless mesh network is not impacted by the transfer of the wireless node, and the wireless node is able to communicate with the destination wireless mesh network gateway, the wireless node passes the evaluation and is appended to the second set of wireless nodes to be transferred.

Figure 8:
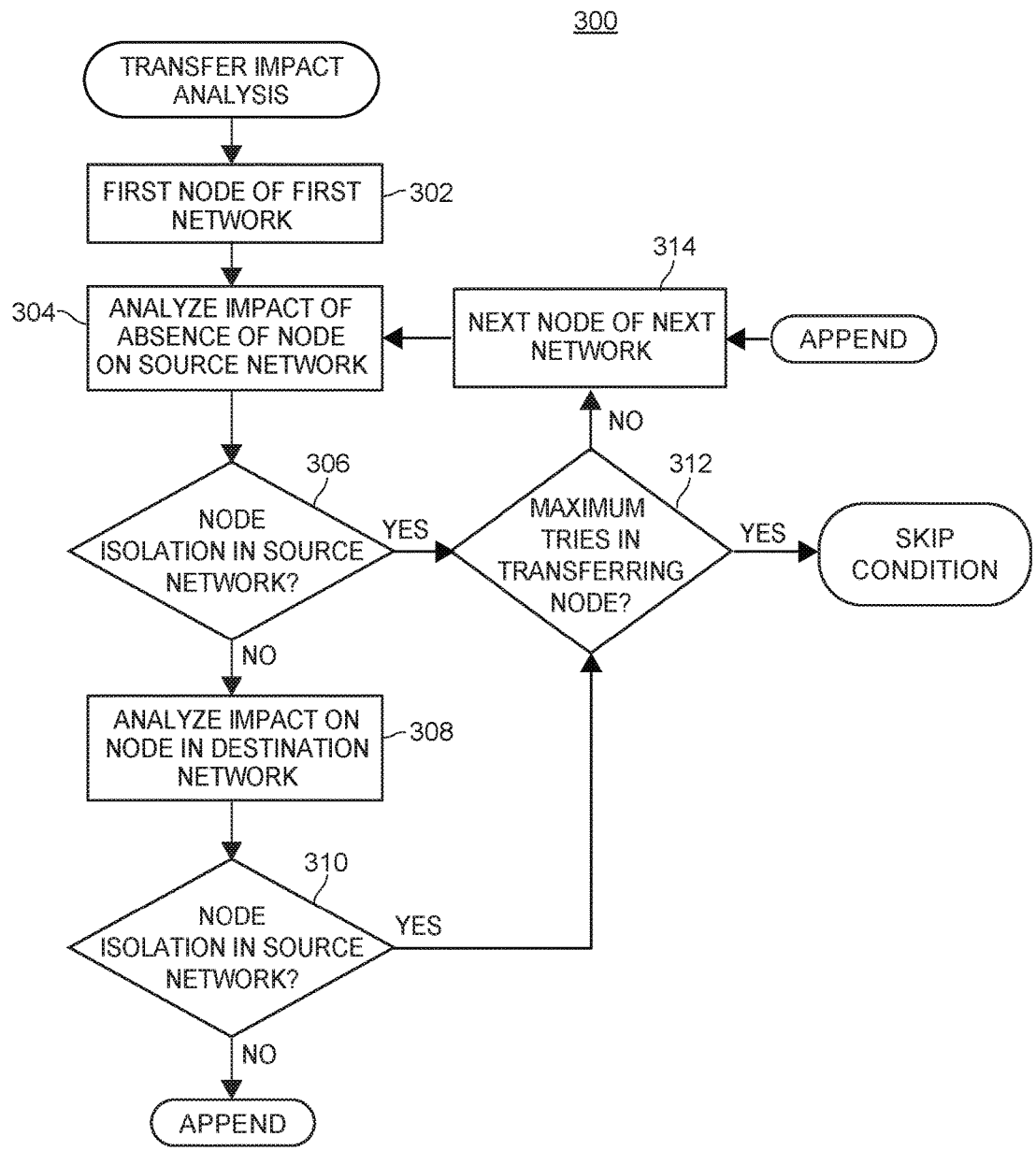
FIG. 8 is a flowchart of a transfer impact analysis routine to identify potential impacts in transferring a wireless node from a source wireless mesh network to a destination wireless mesh network.

FIG. 8 depicts a transfer impact analysis routine 300 for predictively analyzing the impact of the transfer of a wireless node on the source wireless mesh network and the wireless node's ability to communicate with the gateway of the destination wireless mesh network. Beginning at block 302, the routine 300 starts with the first wireless node in the first subset of the set of wireless nodes to be transferred. The first wireless node corresponds to the wireless node having the highest hop count in the subset of wireless nodes with a common gateway, and the first subset corresponds to the subset of wireless nodes with a common gateway having the wireless node with the highest hop count among all subsets. Using the example in FIG. 7E above, the first subset would be the subset of GW2, and the first wireless node in the first subset would be GW2WD9 with a hop count of three. Under the evaluation of GW2WD9, the source wireless mesh network is GW2 and the destination wireless mesh network is GW3.

At block 304, the transfer impact analysis routine 300 executes a predictive analysis on the impact of the wireless node being transferred out of the source wireless mesh network. In particular, the transfer impact analysis routine 300 may simulate the source wireless mesh network without the wireless node under evaluation. Such simulations may be performed using a network emulator or simulator, as is well known by those of ordinary skill in the art, to simulate the source wireless mesh network without the wireless node under evaluation. With such a simulation, the transfer impact analysis routine 300 analyzes the source wireless mesh network without the wireless node under evaluation to determine whether or not each of the remaining wireless nodes can communicate with the gateway. In other words, the predictive analysis at block 304 determines whether any wireless nodes remaining in the source wireless mesh network are solely dependent upon the wireless node under evaluation in order to communicate with the gateway. To state yet another way, the predictive analysis at block 304 determine whether the wireless node under evaluation is a pinch point at the time it is evaluated. If the transfer of the wireless node under evaluation is predicted to leave another wireless node isolated, then the wireless node is not appended to the second set.

As an example, the predictive analysis at block 304 may utilize the pinch point analysis 200 of FIG. 4 with the simulated source wireless mesh network to identify whether wireless nodes are dependent upon the wireless node under evaluation. However, rather than apply the routine 200 to each of the wireless nodes within the simulated source wireless mesh network, the routine 200 need only be applied to the wireless node under evaluation. That is, instead of identifying all pinch points in an existing network, the routine 200 may be executed using the wireless node under evaluation as wireless node 'X' in a simulation of the source network. More particularly, the resulting execution of the routine 200 will include evaluating each of the wireless nodes in the set of wireless nodes (B), which are assumed as not being able to reach the gateway, and removing those that have wireless node 'C' as a neighbor. This eliminates those wireless nodes that can communicate with the wireless gateway via a communication path that does not involve the wireless node under evaluation. Any wireless nodes remaining in the set of wireless nodes (B) after block 224 are considered dependent on the wireless node under evaluation, meaning another wireless node is predicted to be isolated if the wireless node under evaluation is prematurely transferred, as determined at block 306 of the transfer impact analysis routine 300. That is, the transfer impact analysis routine 300 may utilize the resulting set of wireless nodes (B) as identification of wireless nodes that are unable to reach the gateway in the event the wireless node under evaluation is prematurely transferred without another wireless node to provide the communication relay.

In the case of GW2WD9, the execution of the pinch point analysis 200 using GW2WD9 as wireless node X (which is assumed removed from the wireless mesh network 92) results in an evaluation of all remaining wireless nodes in the wireless mesh network 92 (which are assumed as not being able to reach the gateway GW2), and removing those that either reach the gateway GW2 directly or have a neighbor in the set of wireless nodes (C) that have previously been determined as being able to reach the gateway GW2. In this case, the predictive analysis at block 304 does not identify any isolated wireless nodes in the source wireless mesh network 92, because all remaining wireless nodes GW2WD1-GW2WD8 are still able to communicate either directly or indirectly with the gateway GW2.

After conducting a predictive analysis at block 304 to identify any isolated wireless nodes in the simulated source wireless mesh network, and determining that no wireless nodes will be isolated with the transfer at block 306, the transfer impact analysis routine 300 proceeds to block 308 to predict the impact of the transfer on the wireless node under evaluation in the destination wireless mesh network. It will be understood by those of ordinary skill in the art that the predictive analyses at blocks 304 and 308 need not be sequenced in the order depicted in FIG. 8, and the predictive analysis at block 308 (and subsequent determination at block 310) may be executed before the predictive analysis at block 304 (and subsequent determination at block 306).

The prediction at block 308 analyzes whether the wireless node under evaluation will be able to communicate with the gateway of the destination network when transferred. In particular, the transfer impact analysis routine 300 simulates the destination wireless mesh network with the wireless node under evaluation, and without any wireless nodes that are to be transferred out. Again, simulations may be performed using a network emulator or simulator to simulate the destination wireless mesh network with the wireless node under evaluation, and without other wireless nodes that are to be transferred out. Generally, the network simulator or emulator will assign an address to the transferred wireless node in order to test communication abilities between the gateway and the transferred wireless node.

In one example, the simulated destination wireless mesh network may use a ping command to verify connectivity between the gateway and the transferred wireless node via some communication path in the simulated destination wireless mesh network. More particularly, the ping command may be sent to verify whether or not the transferred node can reach the gateway. Either the wireless node sends an echo request to the gateway via the simulated wireless mesh network and waits for an echo reply, or the gateway sends an echo request to the transferred wireless node and waits for an echo reply. The ping is successful if the echo request gets to its target and the target is able to get an echo reply back to the source, and if the ping is successful, the transferred wireless node is determined as being able to communicate with (reach) the gateway. If an echo reply is not received by the source of the ping command, then the transfer impact analysis routine 300 determines that the wireless node under evaluation will be isolated from the destination wireless mesh network if transferred before another wireless node at block 310.

In a further example, the simulated destination wireless mesh network may use a traceroute command to verify connectivity between the gateway and the transferred wireless node via some communication path in the simulated destination wireless mesh network. This may have the added benefit of determining where the communication path breaks down if the traceroute command is unsuccessful, because it may be used to discover the path a packet takes to the target, and where the communication path breaks down to the target. In the simulated destination wireless mesh network, the traceroute command records the source of each "time exceeded" message from each wireless node in the communication path in order to provide a trace of the path the packet took to reach the transferred wireless node. Either the transferred wireless node or the gateway may execute the traceroute command. In either case, the source sends out a sequence of datagrams, each with incrementing Time-To-Live (TTL) values, to an invalid port address of the wireless nodes. The initial datagram(s) has a TTL value of 1 thereby causing the datagram to "timeout" as soon as it hits the first wireless node in the communication path. This wireless node then responds with an "time exceeded" message which indicates that the datagram has expired. The next datagram(s) has a TTL value of 2, which causes the datagram to "timeout" once it reaches the second wireless node in the communication path to the transferred wireless node, and the second wireless node returns a "time exceeded" message. This process continues until the datagrams reach the target and until the source receives "time exceeded" messages from every wireless node in the communication path to the target. When the datagrams reach the target (either the gateway or the transferred wireless node) the datagram(s) attempts to access an invalid port at the target, and the target responds with "port unreachable" messages that indicate an unreachable port. The "port unreachable" message indicates the transferred wireless node is able to communicate with (reach) the gateway. If the "port unreachable" message is not received by the source of the traceroute command, then the transfer impact analysis routine 300 determines that the wireless node under evaluation will be isolated from the destination wireless mesh network if transferred before another wireless node at block 310.

In the case of GW2WD9, the execution of a ping command, traceroute command or similar diagnostic tool between GW2WD9 and the gateway WD3, while assuming GW3WD4, GW3WD6 and GW3WD10 have been transferred out, results in an "echo reply" message, "port unreachable" message, or comparable message being received by the source. In this case, the predictive analysis at block 304 does not identify GW2WD9 as being isolated in the destination wireless mesh network 94, because GW2WD9 is able to communicate with the gateway GW2 either directly or indirectly via GW3WD2 or GW3WD1.

In response to determining that the transfer of the wireless node under evaluation will not leave any other wireless node isolated in the simulated source wireless mesh network and will not leave the wireless node under evaluation isolated in the simulated destination wireless mesh network, the transfer impact analysis routine 300 appends the wireless node under evaluation to the second set of wireless nodes to be transferred. As one example, the appending of the wireless nodes may be performed using the routine shown in FIG. 12, which will be described further below.

On the other hand, in the event the transfer of the wireless node under evaluation will leave at least one other wireless node isolated in the simulated source wireless mesh network at block 306, or will result in isolation of the wireless node under evaluation from the simulated destination wireless mesh network at block 310, the transfer impact analysis routine 300 considers whether a "blind transfer" should be executed at block 312. More particularly, the transfer impact analysis routine 300 may encounter a worst case scenario in which another wireless node should be transferred to the destination wireless mesh network before the wireless node under evaluation. An example of this worst case scenario is depicted in FIG. 9.

Figure 9:
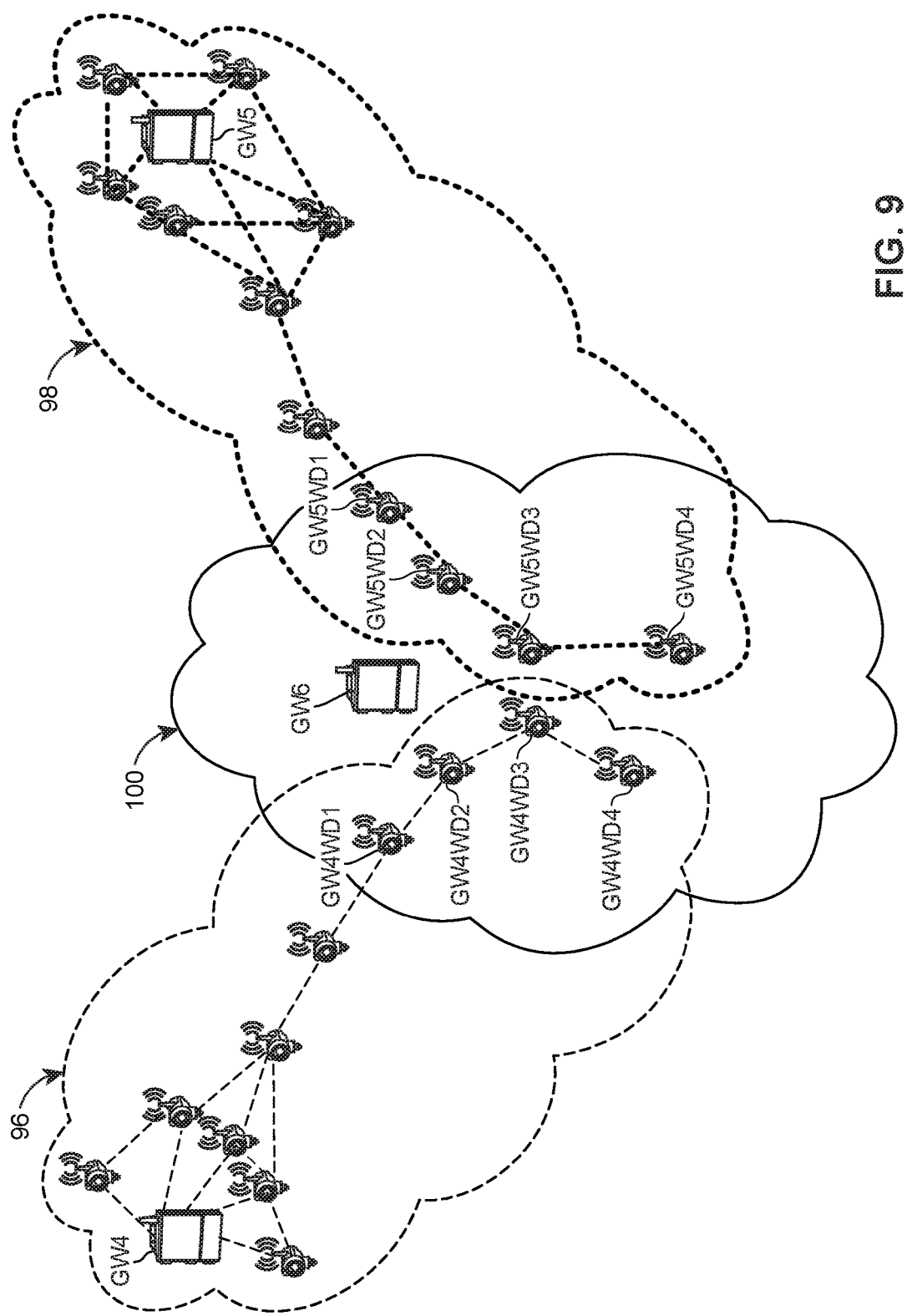
FIG. 9 is a schematic diagram of a wireless mesh networks, in which the transfer impact analysis routine of FIG. 8 encounters an infinite loop requiring a skip condition.

Referring to FIG. 9, wireless nodes from wireless mesh networks 96, 98 are being transferred to a destination wireless mesh network 100. In particular, nodes GW4WD1, GW4WD2, GW4WD3 and GW4WD4 are being transferred from wireless mesh network 96 with gateway GW4 to wireless mesh network 100 with gateway GW6. Similarly, nodes GW5WD1, GW5WD2, GW5WD3 and GW5WD4 are being transferred from wireless mesh network 98 with gateway GW5 to wireless method network 100. In order to transfer GW4WD4 and GW5WD4 to wireless mesh network 100, either of wireless nodes GW4WD3 and/or GW5WD3 should be transferred first in order for GW4WD4 and GW5WD4 to communicate with gateway GW6.

However, the transfer of either wireless node GW4WD3 and/or wireless node GW5WD3 will isolate either wireless node GW4WD4 and/or wireless node GW5WD4. For example, wireless node GW4WD4 communicates indirectly with the gateway GW4 only via wireless node GW4WD3, and wireless node GW5WD4 communicates indirectly with the gateway GW5 only via wireless node GW5WD3. At the same time, in order to establish communication with gateway GW6 after the transfer, GW4WD4 and GW5WD4 both need either of GW4WD3 and/or GW5WD3 to first transfer and establish communication with gateway GW6. Yet, transferring GW4WD3 to the destination wireless mesh network 100 before GW4WD4 would leave GW4WD4 isolated from gateway GW4, and unable to receive the transfer command. Likewise, transferring GW5WD3 to the destination wireless mesh network 100 before GW5WD4 would leave GW5WD4 isolated from gateway GW5.

As a result, the transfer impact analysis routine 300 would be caught in an infinite loop. That is, an evaluation of wireless node GW4WD3 (or GW5WD3) for transfer to destination wireless mesh network 100 would result in a determination at block 306 that wireless node GW4WD4 would be isolated in source wireless mesh network 96 (or GW5WD4 would be isolated in source wireless mesh network 98). On the other hand, an evaluation of wireless node GW4WD4 (or GW5WD4) for transfer to destination wireless mesh network 100 would result in a determination at block 310 that wireless node GW4WD4 (or GW5WD4) would be isolated in the destination wireless mesh network 100.

Accordingly, in response to such determinations at blocks 306 and/or 310, the transfer impact analysis routine 300 maintains a count at block 312 of the number of times the routine 300 has analyzed the wireless node under evaluation. For example, it may often be the case that a wireless node will need to be transfer later in the sequence in order to avoid isolating another wireless node in the source wireless mesh network, or that another wireless node will need to be transferred to a destination wireless mesh network first in order to avoid isolating the wireless node under evaluation in the destination wireless mesh network. Rather than immediately move to a skip condition, the transfer impact analysis routine 300 may continue to evaluate the wireless nodes for transfer from the set of wireless nodes for transfer, and only after a predetermined number of evaluations of a particular wireless node does the transfer impact analysis routine 300 revert to the skip condition.

Assuming a wireless node has not been evaluated a maximum number of tries, as determined at block 312, the next wireless node from the next wireless mesh network is selected at block 314 for evaluation. For example, referring back to the set of wireless nodes for transfer in FIG. 7E, if wireless node GW2WD9 was under evaluation, the next wireless mesh network would be GW3, of which wireless node GW3WD10 is the next wireless node. As such, wireless node GW3WD10 is the next wireless node for evaluation. The transfer impact analysis routine thus evaluates each of the wireless nodes for transfer, until all wireless nodes have been evaluated, at which point the transfer impact analysis routine 300 will proceed to re-evaluate any wireless nodes that have not been sequenced for transfer.

Figure 10:
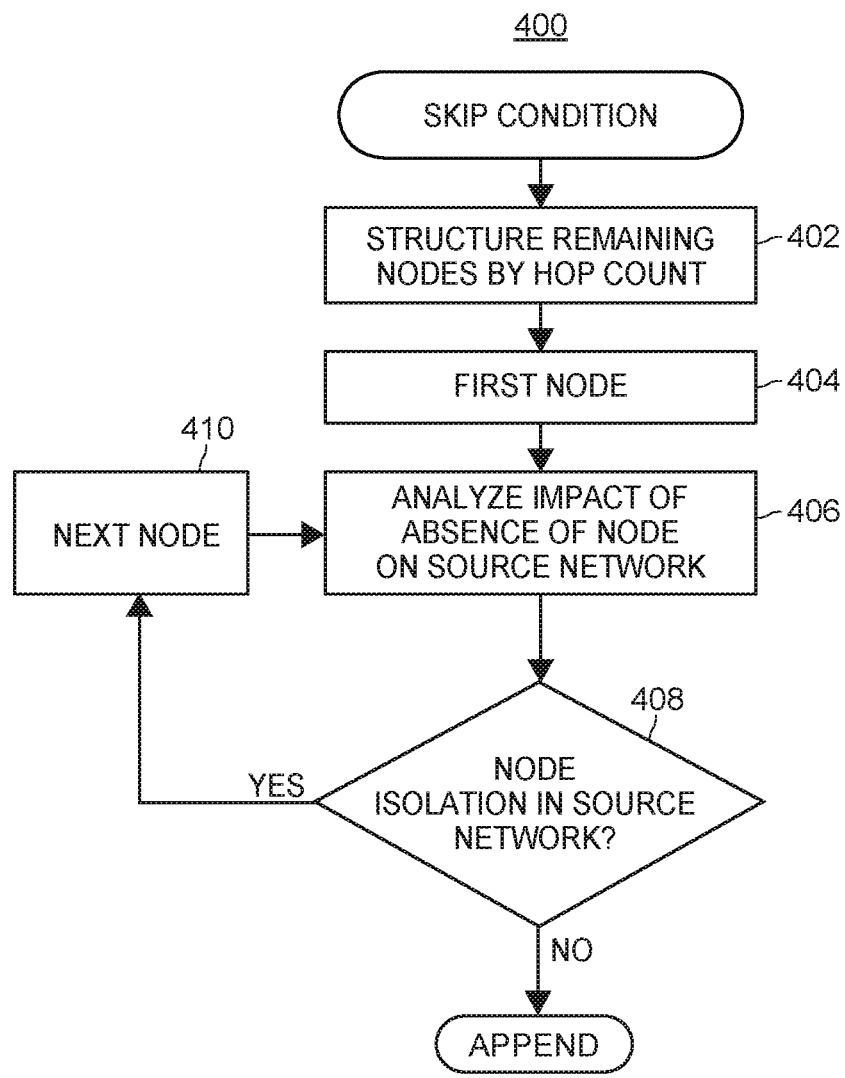
FIG. 10 is a flowchart of a skip condition routine to identify a wireless node for blind transfer from the source wireless mesh network to the destination wireless mesh network.

In the event a wireless node is not sequenced for transfer by the transfer impact analysis routine 300 after a predetermined number of times as determined at block 312, the transfer impact analysis routine 300 may revert to a skip condition to avoid an infinite loop. An example of a skip condition routine 400 is shown in FIG. 10. In summary, the skip condition routine 400 provides a process for selecting a wireless node for "blind" transfer from the source wireless mesh network to the destination wireless mesh network. The transfer is considered "blind" because it is based primarily on its impact on the source wireless mesh network and without consideration of the impact of the wireless node on the destination wireless mesh network in order to break the infinite loop. Once the skip condition routine 400 determines which wireless node to transfer to the destination wireless mesh network, the skip condition 400 routine reverts to the append routine of FIG. 12 (described further below) to include this wireless node in the transfer sequence. If an infinite loop scenario is encountered again, the transfer impact analysis routine 300 will utilize the skip condition routine 400 again for another "blind" transfer.

Beginning at block 402, the skip condition routine 400 restructures the remaining wireless nodes for transfer from the wireless node with the highest hop count with its source wireless mesh network to the wireless nodes with the lowest hop count with its respective source wireless mesh network. For example, the set of wireless nodes for transfer in the example scenario shown in FIG. 9 would be structured by the gathering and structuring routine 250 as shown in FIG. 11A. During the transfer impact analysis routine 300, an evaluation of wireless node GW4WD4 at block 308 results in the conclusion that GW4WD4 would be isolated from the gateway GW6 of the destination wireless mesh network 100, signifying at least one other wireless node would need to be transferred first. However, evaluation of the remaining wireless nodes by the transfer impact analysis routine 300 would result in no wireless node that can be transferred before GW4WD4 that would not result in either isolation of another wireless node from the source wireless mesh network or result in isolation of the wireless node under evaluation. Therefore, the skip condition routine 400 is invoked, and at block 402 the wireless nodes of FIG. 11A are restructured according to hop count from highest to lowest into a third set as shown in FIG. 11B.

At block 404, the skip condition routine 400 starts with the first wireless node as provided in the structure resulting from the previous step. The first wireless node corresponds to the wireless node having the highest hop count among the remaining wireless nodes for transfer. Using the example in FIG. 11B above, the first wireless node would be GW4WD4 with a hop count of six. Under the evaluation of GW4WD4, the source wireless mesh network is the one with gateway GW4 and the destination wireless mesh network is the one with gateway GW6.

At block 406, the skip condition routine 400 executes a predictive analysis on the impact of the wireless node being blind transferred out of the source wireless mesh network. Similar to the transfer impact analysis routine 300, the skip condition routine 400 may simulate the source wireless mesh network without the wireless node under evaluation using, for example, a network emulator or simulator. With such a simulation, the skip condition routine 400 analyzes the source wireless mesh network without the wireless node under evaluation to determine whether or not each of the remaining wireless nodes can communicate with the gateway. If the transfer of the wireless node under evaluation is predicted to leave another wireless node isolated, then the wireless node is not used for the blind transfer.

As an example, the predictive analysis at block 406 may utilize the pinch point analysis 200 of FIG. 4 with the simulated source wireless mesh network to identify whether wireless nodes are dependent upon the wireless node under evaluation, by only applying the wireless node under evaluation to the routine 200 as wireless node 'X'. More particularly, the resulting execution of the routine 200 will include evaluating each of the wireless nodes in the set of wireless nodes (B), which are assumed as not being able to reach the gateway, and removing those that have wireless node 'C' as a neighbor. This eliminates those wireless nodes that can communicate with the wireless gateway via a communication path that does not involve the wireless node under evaluation. Any wireless nodes remaining in the set of wireless nodes (B) after block 224 are considered dependent on the wireless node under evaluation, meaning another wireless node is predicted to be isolated if the wireless node under evaluation is prematurely transferred, as determined at block 408 of the skip condition routine 400.

In the case of GW4WD4, the execution of the pinch point analysis 200 using GW4WD4 as wireless node X (which is assumed removed from the wireless mesh network 96) results in an evaluation of all remaining wireless nodes in the wireless mesh network 96 (which are assumed as not being able to reach the gateway GW4), and removing those that either reach the gateway GW4 directly or have a neighbor in the set of wireless nodes (C) that have previously been determined as being able to reach the gateway GW2. In this case, the predictive analysis at block 306 does not identify any isolated wireless nodes in the source wireless mesh network 96, because all remaining wireless nodes are still able to communicate either directly or indirectly with the gateway GW4.

After conducting a predictive analysis at block 406 to identify any isolated wireless nodes in the simulated source wireless mesh network, and determining that no wireless nodes will be isolated in the source wireless mesh network with the transfer of GW4WD4 at block 408, the skip condition routine 400 proceeds to append wireless node GW4WD4 to the transfer sequence as a blind transfer, even though GW4WD4 will not be able to communicate with the gateway GW6 of the destination wireless mesh network 100. If, on the other hand, GW4WD4 (or any other wireless node under evaluation in the skip condition routine 400) would be left isolated from the gateway GW4 of the source wireless mesh network, the skip condition routine 400 would proceed to evaluate the next wireless node (i.e., GW4WD3) at block 410.

In effect, even though GW4WD4 will not be able to communicate with gateway GW6 upon transfer, GW4WD4 is at least able to receive the transfer command from gateway GW4. Further, it does not leave any other wireless node isolated in the source wireless mesh network 96, so the remaining wireless nodes will be able to receive the transfer command from GW4. Then when another wireless node is transferred to wireless mesh network 100, such as GW4WD3 or GW5WD3, GW4WD4 will be able to communicate with the gateway GW6. Thus, GW4WD4 will only be temporarily isolated from the gateway GW6, while the remaining wireless nodes may be sequenced by the transfer impact routine 300 and subsequently transferred according to the transfer sequence.

Figure 12:
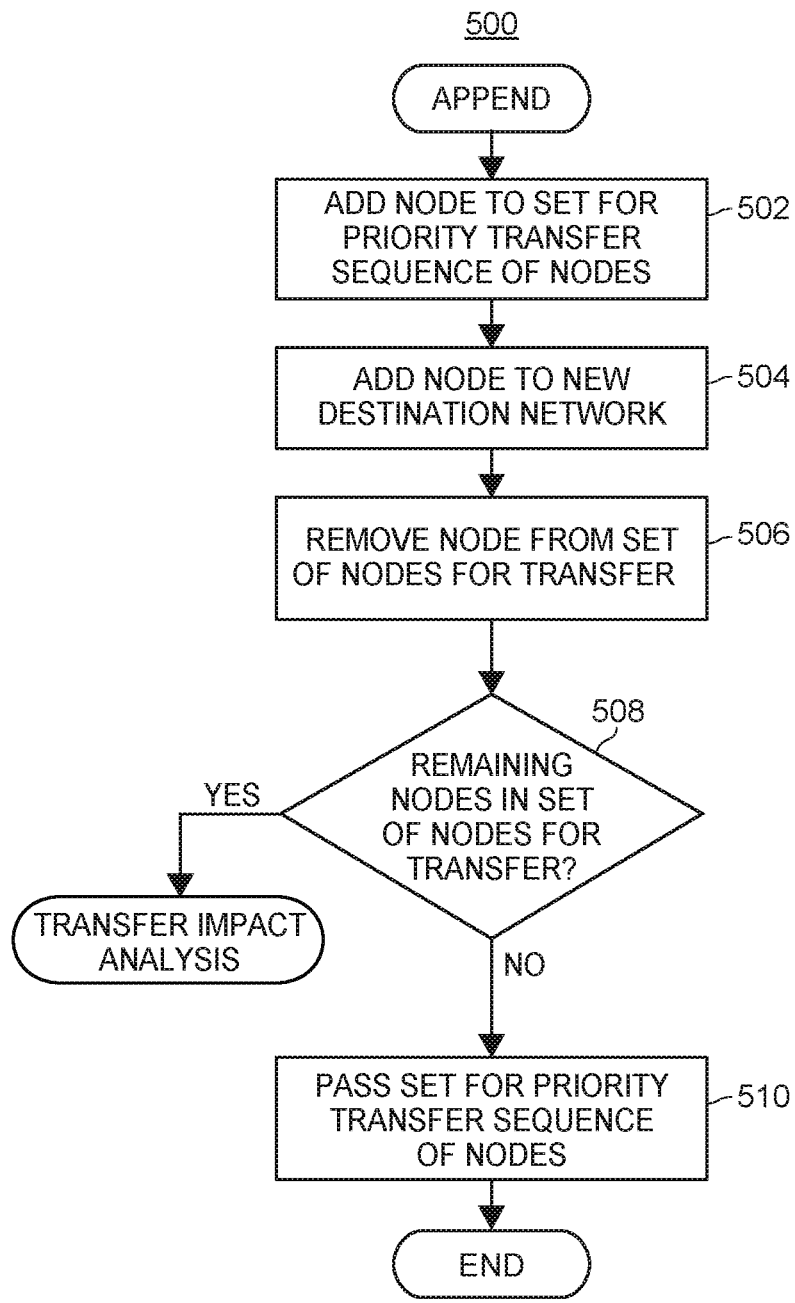
FIG. 12 is a flowchart of an appending routine to append a wireless node to a set of wireless nodes to be transferred that is structured in order of priority of transfer.

Whether a wireless node passes evaluation in the transfer impact routine 300 or is selected for a blind transfer in the skip condition routine 400, the wireless node is appended to the second set of wireless nodes for transfer using an append routine, an example of which is depicted in FIG. 12. The append routine 500 of FIG. 12 not only appends the wireless node to the second set, but also modifies the set of "new" destination wireless mesh networks (FIG. 7E) and the first set (FIG. 7D) for evaluation of the subsequent wireless node. Referring to FIG. 12, the append routine 500 is initiated in response to the first predictive analysis of the source mesh network, and/or the predictive analysis of the wireless node under evaluation in FIG. 8. Alternatively, the append routine 500 may be initiated in response to identifying a wireless node for "blind" transfer that allows the remaining wireless nodes in the source wireless mesh network to communicate with the gateway of the source wireless mesh network in the skip condition routine 400 of FIG. 10.

At block 502, the wireless node is appended to the second set of wireless nodes for transfer, where the second set is structured on account of how the wireless nodes are appended to the second set. More particularly, the second set is initially a null set. The first wireless node for transfer to pass evaluation in FIG. 8 or selected in FIG. 10 is added to the second set first, and becomes the first wireless node for transfer. The next wireless node from transfer to pass evaluation in FIG. 8 or selected in FIG. 10 is added to the second set as the second wireless node for transfer, and so on. When all wireless nodes for transfer from the first set have been evaluated and appended to the second set, the final structure of the second set indicates the priority transfer sequence by which to transfer the wireless nodes to their destination networks.

At block 504, the wireless node is added to the "new" destination wireless mesh network. For example, when wireless node GW2WD9 passes the evaluation of the transfer impact analysis routine 300, it is not only appended to the second set at block 502, but is also added to the set of wireless nodes in FIG. 7E for its destination network 94 (identified by gateway GW3). Thus, evaluation of subsequent wireless nodes may be made with the assumption of the topology of the destination wireless mesh networks as the wireless nodes are transferred from one wireless mesh network to another. For example, referring to FIG. 7E, once wireless node GW2WD9 has been evaluated and appended to the second set, wireless node GW2WD9 is included in the simulation of wireless mesh network 94. Then, when wireless node GW3WD10 is evaluated, it does so with a simulation of its source network 94 having wireless node GW2WD9. That is, the source network 94 with GW2WD9 becomes the "current" network for GW3WD10 at the time GW3WD10 is evaluated for transfer. Similarly, when the transfer impact analysis routine 300 evaluates GW2WD7, it does so with a simulation of its destination wireless mesh network 94 having wireless nodes GW2WD8 and GW2WD9 included in the wireless mesh network 94. As such, the evaluation of GW2WD7 at block 308 of the transfer impact analysis routine 300 would result in a decision at block 310 that GW2WD7 would be able to communicate with wireless gateway GW3 via either GW2WD8 or GW2WD9.

At block 506, the wireless node is removed from the first set of wireless nodes for transfer (FIG. 7D). Thus, any further evaluation of wireless nodes for transfer from the first set is done without that wireless node. For example, if wireless node GW2WD9 is appended to the second set of wireless nodes for transfer and removed from the first set, and a skip condition is later encountered in which the skip condition routine 400 has to select a wireless node for blind transfer, the skip condition will evaluate the remaining wireless nodes in the first set, which does not include wireless node GW2WD9. Rather, wireless node GW2WD9 will be considered as having already been transferred to its "new" destination wireless mesh network.

If there are any wireless nodes remaining in the first set of wireless nodes for transfer as determined at block 508, then the append routine 500 reverts to the transfer impact analysis routine 300 to evaluate the remaining wireless nodes in the first set. On the other hand, if the first set is null (i.e., all wireless nodes for transfer in the first set have been evaluated and appended to the second set), then the second set is finalized and structured such that it presents a priority transfer sequence for the wireless nodes for transfer. The second set may then be passed on at block 510 for subsequent transfer of the wireless nodes therein. In one example, the second set of wireless nodes for transfer may be passed to each of the gateways GW1, GW2, GW3, where the gateways issue transfer commands to the wireless nodes for transfer according to the priority sequence in the second set. In another example, the second set of wireless nodes for transfer may be passed to a centralized computing system that communicates with the gateways of each of the wireless mesh networks, such as the workstation 13, and command each gateway to issue a transfer command to the appropriate wireless node according to the priority sequence of the second set. Thus, multiple wireless nodes maybe logically transferred among multiple wireless mesh networks in a sequence that minimizes disruption and downtime of the wireless mesh networks, even while the wireless mesh networks are in operation (i.e., live).

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device). The instructions, when executed by one or more processors of a corresponding device (e.g., a server, a user interface device, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

The invention claimed is:

1. A method of sequencing a logical transfer of multiple wireless nodes between multiple wireless mesh networks, each wireless mesh network comprising a gateway and a plurality of wireless nodes organized in a mesh topology in communication with the gateway, the method comprising:
  iteratively evaluating each wireless node in a first set of wireless nodes to be transferred beginning with the first wireless node in the first set, each evaluation comprising:
    a first predictive analysis of a source wireless mesh network from which the wireless node is transferred, the first predictive analysis of the source wireless mesh network adapted to test communications between the gateway of the source wireless mesh network without the wireless node under evaluation and each of the remaining wireless nodes within the source wireless mesh network, and identify ones of the remaining wireless nodes that are unable to communicate with the gateway of the source wireless mesh network,
    a predictive analysis of the wireless node under evaluation in a destination wireless mesh network to which the wireless node under evaluation is transferred, the predictive analysis of the wireless node under evaluation adapted to test communications between the gateway of the destination wireless mesh network and the wireless node under evaluation, and without wireless nodes to be transferred out of the destination wireless mesh network, and
    appending a second set of wireless nodes to be transferred between wireless mesh networks with the wireless node under evaluation in response to the first predictive analysis of the source wireless mesh network, and the predictive analysis of the wireless node under evaluation, the wireless nodes to be transferred being structured in the second set in order of priority of transfer.

2. The method of claim 1, wherein the first set comprises a plurality of proper subsets of one or more wireless nodes, the one or more wireless nodes in each of the plurality of proper subsets being in communication with a common gateway and structured therein according to a hop count of a wireless connection with the gateway, and the plurality of proper subsets structured in the first set according to the wireless node having the highest hop count in each proper subset.

3. The method of claim 2, further comprising removing the wireless node under evaluation from the first set in response to the first predictive analysis of the source wireless mesh network and the predictive analysis of the wireless node under evaluation before the next iteration.

4. The method of claim 2, wherein each subsequent iteration comprises the evaluation of the first wireless node in the next proper subset within the first set.

5. The method of claim 1, wherein appending the second set of wireless nodes to be transferred between wireless mesh networks with the wireless node under evaluation in response to the first predictive analysis of the source wireless mesh network comprises appending the second set of wireless nodes in response to all remaining wireless nodes are able to communicate with the gateway of the source wireless mesh network from the first predictive analysis of the source wireless mesh network.

6. The method of claim 1, wherein appending the second set of wireless nodes to be transferred between wireless mesh networks with the wireless node under evaluation in response to the predictive analysis of the wireless node under evaluation comprises appending the second set of wireless nodes in response to the wireless node under evaluation being able to communicate with the gateway of the destination wireless mesh network from the predictive analysis of the wireless node under evaluation.

7. The method of claim 1, further comprising evaluating a wireless node for a blind transfer to the destination wireless mesh network in response to: (1) at least one remaining wireless node being unable to communicate with the gateway of the source wireless mesh network from the first predictive analysis of the source wireless mesh network, or (2) the wireless node under evaluation is unable to communicate with the gateway of the destination wireless mesh network from the predictive analysis of the wireless node under evaluation, the blind transfer evaluation comprising:
  structuring the first set of wireless nodes to be transferred into a third set of wireless nodes to be transferred from highest to lowest hop count; and
  iteratively evaluating each wireless node in the third set beginning with the first wireless node in the third set until the evaluation identifies a wireless node that allows the remaining wireless nodes in the source wireless mesh network to communicate with the gateway of the source wireless mesh network, each evaluation comprising:
    a second predictive analysis of the source wireless mesh network, the second predictive analysis of the source wireless mesh network adapted to test communications between the gateway of the source wireless mesh network without the wireless node under blind transfer evaluation and each of the remaining wireless nodes within the source wireless mesh network, and identify ones of the remaining wireless nodes that are unable to communicate with the gateway of the source wireless mesh network, and
    appending the second set with an identify wireless node under evaluation from the third set in response to identifying a wireless node from the second predictive analysis that allows the remaining wireless nodes in the source wireless mesh network to communicate with the gateway of the source wireless mesh network.

8. The method of claim 7, wherein evaluating a wireless node for a blind transfer to the destination wireless mesh network comprises evaluating a wireless node for a blind transfer to the destination wireless mesh network in response to each of the wireless nodes in the first set having been evaluated using the first predictive analysis of the source wireless mesh network the predictive analysis of the wireless node under evaluation.

9. The method of claim 7, wherein evaluating a wireless node for a blind transfer to the destination wireless mesh network comprises evaluating a wireless node for a blind transfer to the destination wireless mesh network in response to the wireless node under evaluation having been evaluated using the predictive analysis of the wireless node under evaluation and the predictive analysis of the wireless node under evaluation in a threshold number of iterations.

10. The method of claim 1, further comprising including the wireless node under evaluation in the destination wireless mesh network for subsequent predictive analyses in response to the first predictive analysis of the source wireless mesh network, and the predictive analysis of the wireless node under evaluation before the next iteration.

11. The method of claim 1, further comprising logically and individually transferring each of the plurality of wireless nodes to be transferred in the order of priority of transfer in the second set in response to a command from the gateway of the source wireless mesh network.

12. A method of sequencing a logical transfer of multiple wireless nodes between multiple wireless mesh networks, each wireless mesh network comprising a gateway and a plurality of wireless nodes organized in a mesh topology in communication with the gateway, the method comprising:
- iteratively evaluating each wireless node in a first set of wireless nodes to be transferred beginning with the first wireless node in the first set, each evaluation comprising:
  - a first predictive analysis of a source wireless mesh network from which the wireless node is transferred, the first predictive analysis of the source wireless mesh network adapted to test communications between the gateway of the source wireless mesh network without the wireless node under evaluation and each of the remaining wireless nodes within the source wireless mesh network, and identify ones of the remaining wireless nodes that are unable to communicate with the gateway of the source wireless mesh network,
  - appending a second set of wireless nodes to be transferred between wireless mesh networks with the wireless node under evaluation in response to the first predictive analysis of the source wireless mesh network, the wireless nodes to be transferred being structured in the second set in order of priority of transfer, and
  - including the wireless node under evaluation in a destination wireless mesh network for subsequent predictive analyses in response to the first predictive analysis of the source wireless mesh network.

13. The method of claim 12, wherein the first set comprises a plurality of proper subsets of one or more wireless nodes, the one or more wireless nodes in each of the plurality of proper subsets being in communication with a common gateway and structured therein according to a hop count of a wireless connection with the gateway, and the plurality of proper subsets structured in the first set according to the wireless node having the highest hop count in each proper subset.

14. The method of claim 13, further comprising removing the wireless node under evaluation from the first set in response to the first predictive analysis of the source wireless mesh network.

15. The method of claim 13, wherein each subsequent iteration comprises the evaluation of the first wireless node in the next proper subset within the first set.

16. The method of claim 12, wherein appending the second set of wireless nodes to be transferred between wireless mesh networks with the wireless node under evaluation in response to the first predictive analysis of the source wireless mesh network comprises appending the second set of wireless nodes in response to all remaining wireless nodes are able to communicate with the gateway of the source wireless mesh network from the first predictive analysis of the source wireless mesh network.

17. The method of claim 12, further comprising evaluating a wireless node for a blind transfer to a destination wireless mesh network in response to at least one remaining wireless node being unable to communicate with the gateway of the source wireless mesh network from the first predictive analysis of the source wireless mesh network, the blind transfer evaluation comprising:
- structuring the first set of wireless nodes to be transferred into a third set of wireless nodes to be transferred from highest to lowest hop count; and
- iteratively evaluating each wireless node in the third set beginning with the first wireless node in the third set until the evaluation identifies a wireless node that allows the remaining wireless nodes in the source wireless mesh network to communicate with the gateway of the source wireless mesh network, each evaluation comprising:
  - a second predictive analysis of the source wireless mesh network, the second predictive analysis of the source wireless mesh network adapted to test communications between the gateway of the source wireless mesh network without the wireless node under blind transfer evaluation and each of the remaining wireless nodes within the source wireless mesh network, and identify ones of the remaining wireless nodes that are unable to communicate with the gateway of the source wireless mesh network, and
  - appending the second set with an identify wireless node under evaluation from the third set in response to identifying a wireless node from the second predictive analysis that allows the remaining wireless nodes in the source wireless mesh network to communicate with the gateway of the source wireless mesh network.

18. The method of claim 17, wherein evaluating a wireless node for a blind transfer to the destination wireless mesh network comprises evaluating a wireless node for a blind transfer to the destination wireless mesh network in response to each of the wireless nodes in the first set having been evaluated using the first predictive analysis of the source wireless mesh network in a threshold number of iterations.

19. The method of claim 12, further comprising logically and individually transferring each of the plurality of wireless nodes to be transferred in the order of priority of transfer in the second set in response to a command from the gateway of the source wireless mesh network.

20. A method of sequencing a logical transfer of multiple wireless nodes between multiple wireless mesh networks, each wireless mesh network comprising a gateway and a plurality of wireless nodes organized in a mesh topology in communication with the gateway, the method comprising:
- iteratively evaluating each wireless node in a first set of wireless nodes to be transferred beginning with the first wireless node in the first set, each evaluation comprising:
  - a predictive analysis of the wireless node under evaluation in a destination wireless mesh network to which the wireless node under evaluation is transferred, the predictive analysis of the wireless node under evaluation adapted to test communications between the gateway of the destination wireless mesh network and the wireless node under evaluation, and without wireless nodes to be transferred out of the destination wireless mesh network, and
  - appending a second set of wireless nodes to be transferred between wireless mesh networks with the wireless node under evaluation in response to the predictive analysis of the wireless node under evaluation, the wireless nodes to be transferred being structured in the second set in order of priority of transfer.

21. The method of claim 20, wherein the first set comprises a plurality of proper subsets of one or more wireless nodes, the one or more wireless nodes in each of the plurality of proper subsets being in communication with a common gateway and structured therein according to a hop count of a wireless connection with the gateway, and the plurality of proper subsets structured in the first set according to the wireless node having the highest hop count in each proper subset.

22. The method of claim 21, further comprising removing the wireless node under evaluation from the first set in response to the predictive analysis of the wireless node under evaluation before the next iteration.

23. The method of claim 21, wherein each subsequent iteration comprises the evaluation of the first wireless node in the next proper subset within the first set.

24. The method of claim 20, wherein appending the second set of wireless nodes to be transferred between wireless mesh networks with the wireless node under evaluation in response to the predictive analysis of the wireless node under evaluation comprises appending the second set of wireless nodes in response to the wireless node under evaluation being able to communicate with the gateway of the destination wireless mesh network from the predictive analysis of the wireless node under evaluation.

25. The method of claim 20, further comprising evaluating a wireless node for a blind transfer to the destination wireless mesh network in response to the wireless node under evaluation is unable to communicate with the gateway of the destination wireless mesh network from the predictive analysis of the wireless node under evaluation, the blind transfer evaluation comprising:
    structuring the first set of wireless nodes to be transferred into a third set of wireless nodes to be transferred from highest to lowest hop count; and
    iteratively evaluating each wireless node in the third set beginning with the first wireless node in the third set until the evaluation identifies a wireless node that allows the remaining wireless nodes in the source wireless mesh network to communicate with the gateway of the source wireless mesh network, each evaluation comprising:
        a predictive analysis of the source wireless mesh network, the predictive analysis of the source wireless mesh network adapted to test communications between the gateway of the source wireless mesh network without the wireless node under blind transfer evaluation and each of the remaining wireless nodes within the source wireless mesh network, and identify ones of the remaining wireless nodes that are unable to communicate with the gateway of the source wireless mesh network, and
        appending the second set with an identify wireless node under evaluation from the third set in response to identifying a wireless node from the predictive analysis of the source wireless mesh network that allows the remaining wireless nodes in the source wireless mesh network to communicate with the gateway of the source wireless mesh network.

26. The method of claim 25, wherein evaluating a wireless node for a blind transfer to the destination wireless mesh network comprises evaluating a wireless node for a blind transfer to the destination wireless mesh network in response to the wireless node under evaluation having been evaluated using the predictive analysis of the wireless node under evaluation in a threshold number of iterations.

27. The method of claim 20, further comprising including the wireless node under evaluation in the destination wireless mesh network for subsequent predictive analyses in response to the predictive analysis of the wireless node under evaluation before the next iteration.

28. The method of claim 20, further comprising logically and individually transferring each of the plurality of wireless nodes to be transferred in the order of priority of transfer in the second set in response to a command from the gateway of the source wireless mesh network.

29. A process control system comprising:
    a plurality of wireless mesh networks, each mesh network having a gateway and a plurality of wireless nodes communicatively coupled to the gateway;
    a network manager communicatively coupled to each gateway and adapted to iteratively evaluate each wireless node in a first set of wireless nodes to be transferred beginning with the first wireless node in the first set, each evaluation comprising:
        a first predictive analysis of a source wireless mesh network from which the wireless node is transferred, the first predictive analysis of the source wireless mesh network adapted to test communications between the gateway of the source wireless mesh network without the wireless node under evaluation and each of the remaining wireless nodes within the source wireless mesh network, and identify ones of the remaining wireless nodes that are unable to communicate with the gateway of the source wireless mesh network,
        a predictive analysis of the wireless node under evaluation in a destination wireless mesh network to which the wireless node under evaluation is transferred, the predictive analysis of the wireless node under evaluation adapted to test communications between the gateway of the destination wireless mesh network and the wireless node under evaluation, and without wireless nodes to be transferred out of the destination wireless mesh network, and
        appending a second set of wireless nodes to be transferred between wireless mesh networks with the wireless node under evaluation in response to the first predictive analysis of the source wireless mesh network, and the predictive analysis of the wireless node under evaluation, the wireless nodes to be transferred being structured in the second set in order of priority of transfer.

30. The process control system of claim 29, wherein the first set comprises a plurality of proper subsets of one or more wireless nodes, the one or more wireless nodes in each of the plurality of proper subsets being in communication with a common gateway and structured therein according to a hop count of a wireless connection with the gateway, and the plurality of proper subsets structured in the first set according to the wireless node having the highest hop count in each proper subset.

31. The process control system of claim 30, wherein the evaluation further comprises removing the wireless node under evaluation from the first set in response to the first predictive analysis of the source wireless mesh network and the predictive analysis of the wireless node under evaluation before the next iteration.

32. The process control system of claim 30, wherein each subsequent iteration comprises the evaluation of the first wireless node in the next proper subset within the first set.

33. The process control system of claim 29, wherein appending the second set of wireless nodes to be transferred between wireless mesh networks with the wireless node under evaluation in response to the first predictive analysis of the source wireless mesh network comprises appending the second set of wireless nodes in response to all remaining wireless nodes are able to communicate with the gateway of the source wireless mesh network from the first predictive analysis of the source wireless mesh network.

34. The process control system of claim 29, wherein appending the second set of wireless nodes to be transferred between wireless mesh networks with the wireless node under evaluation in response to the predictive analysis of the wireless node under evaluation comprises appending the second set of wireless nodes in response to the wireless node under evaluation being able to communicate with the gateway of the destination wireless mesh network from the predictive analysis of the wireless node under evaluation.

35. The process control system of claim 29, wherein the network manager is adapted to evaluate a wireless node for a blind transfer to the destination wireless mesh network in response to: (1) at least one remaining wireless node being unable to communicate with the gateway of the source wireless mesh network from the first predictive analysis of the source wireless mesh network, or (2) the wireless node under evaluation is unable to communicate with the gateway of the destination wireless mesh network from the predictive analysis of the wireless node under evaluation, the blind transfer evaluation comprising:
  structuring the first set of wireless nodes to be transferred into a third set of wireless nodes to be transferred from highest to lowest hop count; and
  iteratively evaluating each wireless node in the third set beginning with the first wireless node in the third set until the evaluation identifies a wireless node that allows the remaining wireless nodes in the source wireless mesh network to communicate with the gateway of the source wireless mesh network, each evaluation comprising:
    a second predictive analysis of the source wireless mesh network, the second predictive analysis of the source wireless mesh network adapted to test communications between the gateway of the source wireless mesh network without the wireless node under blind transfer evaluation and each of the remaining wireless nodes within the source wireless mesh network, and identify ones of the remaining wireless nodes that are unable to communicate with the gateway of the source wireless mesh network, and
    appending the second set with an identify wireless node under evaluation from the third set in response to identifying a wireless node from the second predictive analysis that allows the remaining wireless nodes in the source wireless mesh network to communicate with the gateway of the source wireless mesh network.

36. The process control system of claim 35, wherein the network manager is adapted to evaluate a wireless node for a blind transfer to the destination wireless mesh network in response to each of the wireless nodes in the first set having been evaluated using the first predictive analysis of the source wireless mesh network the predictive analysis of the wireless node under evaluation.

37. The process control system of claim 35, wherein the network manager is adapted to evaluate a wireless node for a blind transfer to the destination wireless mesh network in response to the wireless node under evaluation having been evaluated using the predictive analysis of the wireless node under evaluation and the predictive analysis of the wireless node under evaluation in a threshold number of iterations.

38. The process control system of claim 29, wherein the evaluation further comprises including the wireless node under evaluation in the destination wireless mesh network for subsequent predictive analyses in response to the first predictive analysis of the source wireless mesh network, and the predictive analysis of the wireless node under evaluation before the next iteration.

39. The process control system of claim 29, wherein the network manager is adapted to logically and individually transfer each of the plurality of wireless nodes to be transferred in the order of priority of transfer in the second set in response to a command from the gateway of the source wireless mesh network.

* * * * *